(12) United States Patent
Naik

(10) Patent No.: US 12,486,006 B1
(45) Date of Patent: Dec. 2, 2025

(54) SYSTEMS AND METHODS FOR DETECTING HAZARDS IN A MARINE ENVIRONMENT USING A VISION SYSTEM OF A MARINE VESSEL

(71) Applicant: Brunswick Corporation, Mettawa, IL (US)

(72) Inventor: Aadish Dilip Naik, Chicago, IL (US)

(73) Assignee: Brunswick Corporation, Mettawa, IL (US)

( * ) Notice: Subject to any disclaimer, the term of this patent is extended or adjusted under 35 U.S.C. 154(b) by 68 days.

(21) Appl. No.: 18/613,969

(22) Filed: Mar. 22, 2024

(51) Int. Cl.
- *B63B 49/00* (2006.01)
- *B63B 43/18* (2006.01)
- *B63B 79/15* (2020.01)

(52) U.S. Cl.
CPC .............. *B63B 43/18* (2013.01); *B63B 79/15* (2020.01)

(58) Field of Classification Search
CPC ................................ B63B 43/18; B63B 79/15
See application file for complete search history.

(56) References Cited

U.S. PATENT DOCUMENTS

| | | | |
|---|---|---|---|
| 10,372,976 B2 | 8/2019 | Kollman et al. | |
| 10,730,600 B2 | 8/2020 | Gonring | |
| 11,618,538 B2 | 4/2023 | Gonring et al. | |
| 2016/0214534 A1* | 7/2016 | Richards | H04N 13/25 |
| 2020/0012283 A1* | 1/2020 | Nguyen | G05D 1/0206 |
| 2020/0023926 A1* | 1/2020 | Sandberg | G05D 1/0038 |

* cited by examiner

*Primary Examiner* — An T Nguyen
(74) *Attorney, Agent, or Firm* — Andrus Intellectual Property Law, LLP

(57) ABSTRACT

A system for detecting and warning users of hazards in a marine environment using a vision system of a marine vessel is provided, the system comprising: an imaging device mounted to the marine vessel with an associated field of view of the marine environment, which includes water; and a processor configured to: identify, based on image data from the imaging device, an object in the environment that is a potential hazard for a swimmer; determine whether the object is likely to impact safety of a user in the water; in response to determining that the object is likely to impact safety of the user, cause an alert to be presented indicative of a hazard to the user in the marine environment.

20 Claims, 6 Drawing Sheets

SYSTEMS AND METHODS FOR DETECTING HAZARDS IN A MARINE ENVIRONMENT USING A VISION SYSTEM OF A MARINE VESSEL

FIELD

The present disclosure generally relates to systems and methods for detecting hazards in a marine environment using a vision system of a marine vessel.

BACKGROUND

The following U.S. Patents are incorporated herein by reference, in entirety:

U.S. Pat. No. 10,372,976 discloses an object detection system for a marine vessel having at least one marine drive that includes at least one image sensor positioned on the marine vessel and configured to capture an image of a marine environment on or around the marine vessel. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,730,600 discloses a method of operating a wireless lanyard system on a marine vessel having at least one propulsion device includes defining a permitted zone with respect to a helm area where an operator should occupy based on one or more conditions of the marine vessel. Generating a location inquiry signal by a helm transceiver at the helm area of the marine vessel, and receiving an operator location signal from an operator fob worn by the operator of the marine vessel in response to the location inquiry signal. The method further includes determining whether the operator is within the permitted zone with respect to the helm area based on the operator location signal, and generating a lanyard event when the operator is not within the permitted zone. Upon generation of the lanyard event, the propulsion device is controlled to reduce an engine RPM to an idle RPM or the propulsion device is turned off.

U.S. Pat. No. 11,618,538 discloses a vessel control system for a marine vessel propelled by at least one propulsion device includes a wireless lanyard system including at least one fob worn by an individual on the marine vessel and a helm transceiver at a helm area of the marine vessel configured to receive radio signals from the at least one fob. A controller is configured to detect, based on communications between each of the at least one fob and the helm transceiver, that each of the at least one fob is present on the marine vessel. A missing fob is detected if at least one of the fobs is no longer detected at the helm transceiver, and then a man overboard event is generated. The vessel control system is configured to automatically activate one or more search assistance functions based on the man overboard event.

SUMMARY

In accordance with some embodiments of the discloses subject matter, a system for detecting and warning users of hazards in a marine environment using a vision system of a marine vessel is provided, the system comprising: an imaging device, wherein the imaging device is configured to be mounted to the marine vessel with an associated field of view of the marine environment of the marine vessel, and wherein the marine environment includes water; and one or more hardware processors configured to: identify, based on image data from the imaging device, an object in the environment that is a potential hazard for a swimmer, wherein the object is associated with a location in the environment of the marine vessel; determine whether the object is likely to impact safety of a user of the marine vessel that is in the water; in response to determining that the object is likely to impact safety of the user in the water, cause an alert to be presented based on the determination that the object is likely to impact safety of the user, the alert indicative of a hazard to the user in the marine environment.

In some embodiments, the one or more hardware processors are further configured to: determine that at least one user is in the water; identify, during a time period when the user is in the water, whether objects in the environment that is a potential hazard for a swimmer.

In some embodiments, the imaging device comprises a stereoscopic camera.

In some embodiments, the system further comprises: an output device; wherein the one or more hardware processors are further configured to: present the alert using the output device.

In some embodiments, the output device comprises a multi-function display.

In some embodiments, the one or more hardware processors are further configured to: establish a communication link with a mobile device; in response to determining that the object is likely to impact safety of the user in the water, transmit a signal to the mobile device indicative of hazard to the user in the maritime environment, thereby causing the mobile device to present the alert.

In some embodiments, the mobile device is configured to be worn by the user.

In some embodiments, the one or more hardware processors are further configured to: transmit the signal using a first communication modality; and in response to determining that the object is likely to impact safety of the user in the water, transmit a second signal to the mobile device indicative of hazard to the user in the maritime environment using a second communication modality.

In some embodiments, the system further comprises: a wireless transceiver configured to transmit signals using electromagnetic waves; and a transducer configured to transmit signals using sound waves, wherein the first communication modality utilizes electromagnetic waves, and the second communication modality utilizes sound waves.

In some embodiments, the one or more hardware processors are further configured to: determine, based on the image data from the imaging device, a classification of the object from a plurality of classes; and identify the object as a potential hazard based on the classification.

In some embodiments, the one or more hardware processors are further configured to: estimate a location of the user with respect to the marine vessel; predict a location of the object at each of a plurality of times within a predetermined period of time; determine whether the object is predicted to be within a predetermined distance of the user at any of the plurality of times; in response to determining that the object is predicted to be within the predetermined distance at any of the plurality of times, determine that the object is predicted to encounter the user within the predetermined period of time; and in response to determining that the object is predicted to encounter the user within the predetermined period of time, determine that the object is likely to impact safety of the user in the water.

In some embodiments, the system further comprises: a plurality of imaging devices, including the imaging device, wherein each of the plurality of imaging devices configured to be mounted to the marine vessel with an associated field of view of the marine environment of the marine vessel, and wherein each of the plurality of imaging devices is associated with a three-dimensional camera coordinate system; wherein the one or more hardware processors are further configured to: receive image data from each of the plurality of imaging devices; identify, based on image data from a first imaging device of the plurality of imaging devices, a person in the water; determine three-dimensional location information associated with the person in a three-dimensional global coordinate system based on a transform between the camera coordinate system associated with the first imaging device and the global coordinate system; and estimate the location of the user based on the three-dimensional location information associated with the person.

In some embodiments, the predetermined distance is based on a speed of the object, such that at a first speed $v_1$ the predetermined distance is a first value $d_1$ and at a second speed $v_2$ the predetermined distance is a second value $d_2$, $v_2 > v_1$ and $d_2 > d_1$.

In some embodiments, the one or more hardware processors are further configured to: receive the image data from the imaging device; determine, based on the image data, that the object is a second marine vessel; and in response to determining that the object is likely to impact safety of the user in the water, transmit a second alert to the second marine vessel, the second alert indicative of a swimmer present in the marine environment.

In some embodiments, the system further comprises: a wearable device for warning users of hazards in the marine environment, comprising: a haptic feedback device; one or more receivers; and at least one hardware processor configured to: establish a communication link with the marine vessel; determine that the wearable device is in water; in response to determining that the wearable device is in water, monitor, using the one or more receivers, one or more communication modes for a warning signal from the marine vessel; receive, from the marine vessel, a warning signal via at least one communication mode of the one or more communication modes; and in response to receiving the warning signal, cause the haptic feedback device to provide haptic feedback indicative of a hazard to a user in the marine environment, thereby presenting the alert.

In accordance with some embodiments of the discloses subject matter, a method for detecting and warning users of hazards in a marine environment using a vision system of a marine vessel is provided, the method comprising: identifying, based on image data from an imaging device, an object in the environment that is a potential hazard for a swimmer, wherein the object is associated with a location in the environment of the marine vessel, and wherein the imaging device is configured to be mounted to the marine vessel with an associated field of view of the marine environment of the marine vessel, the marine environment including water; determining whether the object is likely to impact safety of a user of the marine vessel that is in the water; in response to determining that the object is likely to impact safety of the user in the water, causing an alert to be presented based on the determination that the object is likely to impact safety of the user, the alert indicative of a hazard to the user in the marine environment.

In accordance with some embodiments of the discloses subject matter, a wearable device for warning users of hazards in a marine environment is provided, the wearable device comprising: a haptic feedback device; one or more receivers; and one or more hardware processors configured to: establish a communication link with a marine vessel; determine that the wearable device is in water; in response to determining that the wearable device is in water, monitor, using the one or more receivers, one or more communication modes for a warning signal from the marine vessel; receive, from the marine vessel, a warning signal via at least one communication mode of the one or more communication modes; and in response to receiving the warning signal, cause the haptic feedback device to provide haptic feedback indicative of a hazard to a user in the marine environment.

In some embodiments, the one or more receivers comprising: a wireless transceiver configured to receive signals transmitted using electromagnetic waves; and a transducer configured to detect signals transmitted using sound waves.

In accordance with some embodiments of the discloses subject matter, a method for warning users of hazards in a marine environment using a wearable device is provided, the method comprising: establishing a communication link with a marine vessel; determining that the wearable device is in water; in response to determining that the wearable device is in water, monitoring, using one or more receivers of the wearable device, one or more communication modes for a warning signal from the marine vessel; receiving, from the marine vessel, a warning signal via at least one communication mode of the one or more communication modes; and in response to receiving the warning signal, causing a haptic feedback device of the wearable device to provide haptic feedback indicative of a hazard to a user in the marine environment.

BRIEF DESCRIPTION OF THE DRAWINGS

The present disclosure is described with reference to the following drawings.

DETAILED DESCRIPTION

In areas that are not designated as exclusively for swimming (e.g., via regulator markers, etc.), there are potentially an increased risks to swimmers from other vessels, and/or wildlife. For example, when passengers from a power driven marine vessel swim, snorkel, or dive around in an area around the vessel, other vessels passing near the marine vessel may not notice that there are people in the water, and may not take adequate action to avoid endangering anyone in the water. In many situations, swimmers in the water around the marine vessel need to be warned about potential hazards, such as other vessels approaching or dangerous wildlife. Today, the captain of the vessel (or another person keeping a lookout) warns swimmers via verbal warnings and/or physical signals. This may not always be effective, as a swimmer may not be looking toward the vessel and/or may not hear a verbal warning, as marine environments can be noisy. Such warnings may be especially ineffective if a swimmer is below the surface of the water where ambient noise in the air cannot be heard. Additionally, a captain (or another person keeping a lookout) has a limited field of view, and may have other responsibilities that may cause them to miss an approaching hazard.

In some embodiments, mechanisms described herein can utilize a perception system of a marine vessel to detect a presence of a potential hazard. For example, a perception system (sometimes referred to as a vision system herein), can continuously monitor roughly the entire area (e.g., with a combined 360 degree field of view) around the marine vessel, and can detect hazards that a human may miss, may not see in time (e.g., a fast moving vessel), and/or may not appreciate (e.g., a vessel that is not approaching the swimmers closely, but that generates a large wake that may endanger the swimmers).

In some embodiments, when a hazard is detected, mechanisms described herein can generate an alert that is presented to the swimmers (e.g., via a wearable device), a user that is onboard (e.g., the captain and/or another person onboard maintaining a lookout), and/or the vessel that is approaching (e.g., via a vehicle-to-vehicle (V2V) communication, a vehicle-to-everything (V2E) communication, etc.). In some embodiments, mechanisms described herein can be used to implement a system(s) that facilitate communication to people in the water and/or others that mitigates risks to the people in the water.

Figure 1:
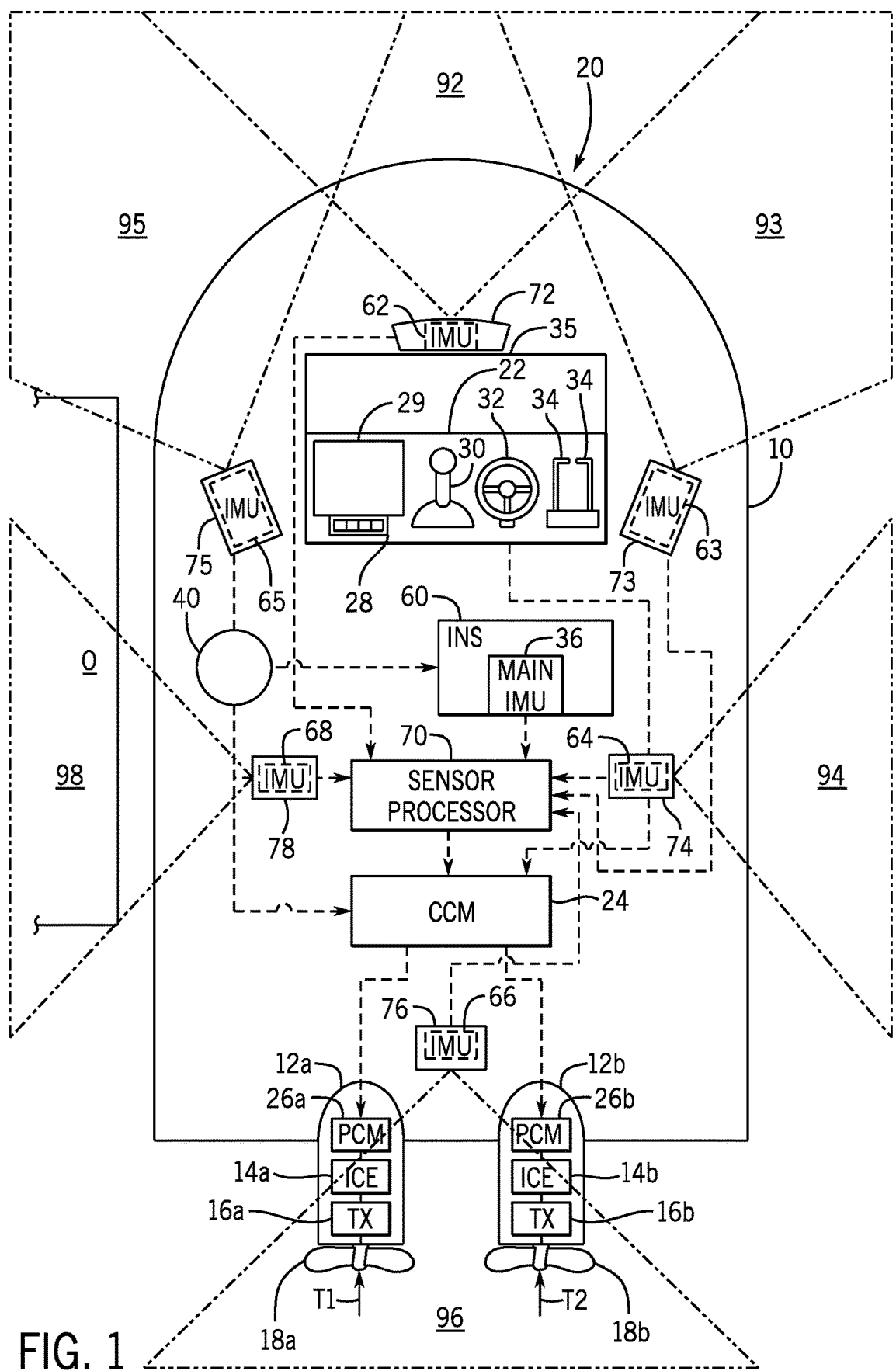
FIG. 1 shows an example of a propulsion system on a marine vessel in accordance with some embodiments of the disclosure.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a, 18b.

In some embodiments, vessel 10 can also house various control elements that comprise part of the marine propulsion system 20. For example, marine propulsion system 20 can comprise an operation console 22 in signal communication (e.g., via a controller area network (CAN) bus) with a controller 24, such as a command control module (CCM), and with propulsion control modules (PCM) 26a, 26b associated with the respective propulsion devices 12a, 12b. Each of controller 24 and PCMs 26a, 26b can include memory and a programmable processor. For example, each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored.

Note that although mechanisms described herein are generally described in connection with an internal combustion engine (ICE) propulsion system that includes a powerhead implemented using an ICE engine, mechanisms described herein can be used in connection with a propulsion system that includes any other suitable powerhead(s), such as one or more electric motors, or any suitable combination of powerheads. For example, propulsion devices 12a, 12b can be replaced by, or used in combination with, one or more propulsion devices that produce thrust to propel vessel 10 using an electric motor, such as an electric outboard motor, electric inboard motor, electric stern drive, electric jet drive, electric pod drive, any other suitable propulsion device, or combinations thereof, that is implemented using an electric motor (e.g., which can be implemented as a motor that is directly connected to a propulsor shaft without a transmission, such as transmission 16a, 16b).

In some embodiments, operation console 22 can include any suitable number of user input devices, such as, a keypad 28, a joystick 30, a steering wheel 32, one or more throttle/shift levers 34, etc., and any suitable number of output devices, such as a display 29, a heads-up display (HUD) 35, one or more speakers (not shown; e.g., a conventional speaker(s), an underwater speaker(s), etc.), one or more sound producing devices (e.g., an air horn(s), a bell(s), a whistle(s), etc.), etc. In some embodiments, each of the input devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (e.g., forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10.

In some embodiments, output devices, such as display 29, HUD 35, speakers, etc., can be configured to present (e.g., visually, audibly, etc.) any suitable data, information, image data (e.g., images captured by one or more devices that include an image sensor(s)), received from controller 24, from another controller or processor, and/or generated based on data and/or information received from controller 24, another controller, and/or processor. In some embodiments, display 29 can be any suitable display, such as a multi-function display (MFD). In some embodiments, display 29 can be used to present a user interface, which can be implemented as a touchscreen or display that is capable of receiving input via a touchscreen. In some embodiments, one or more other input devices can be used to interact with a user interface (e.g., a graphical user interface) presented by display 29, such as a keypad (e.g., keypad 28), a keyboard, a track ball, a track pad, any other suitable user input device, and/or suitable combination of user input devices. In some embodiments, vessel 10 can include multiple displays 29, which can be integrated into operation console 22, integrated into another portion of vessel 10, and/or mechanically mounted to operation console 22 or another portion of vessel 10. In some embodiments, display 29 can be used to present menus, operational data (e.g., throttle, speed, heading, engine output, etc.), maps, charts, settings that can be used to configure another display (e.g., HUD 35), etc. In some embodiments, HUD 35 can be any suitable display device which can present both a user interface (e.g., on a side of HUD facing toward operation console) and a view of an environment that could be seen if the HUD was not there. In some embodiments, HUD 35 can be implemented using a techniques presently known in the art, such as those used in aircraft. In some embodiments, display 29 and/or HUD 35 can be omitted. For example, vessel 10 can include only MFDs (e.g., display 29) or only a HUD (e.g., HUD 35), or both can be omitted (e.g., where a mobile device, such as a tablet computer, laptop computer, head-mounted display, etc. is configured to present a user interface of vessel 10).

In some embodiments, propulsion system 20 can also include one or more depth sensors 72, 73, 74, 75, 76, and 78, which can be implemented using any suitable imaging device. In some embodiments, depth sensors 72-78 can form a portion of a vision system associated with vessel 10 (although the vision system may be configured to use sensing modes other than visible light, such as sound-based sensing, radio-based sensing, infrared-based sensing, etc.). Although a limited number of depth sensors are shown (e.g., one perpendicular to each of the bow, stern, and port and starboard sides the vessel 10, and two positioned at an angle between the bow and sides), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a water surface) that is within a field of view of the depth sensor (e.g., partial FOVs 92, 93, 94, 95, 96, and 98 shown in FIG. 1, associated with depth sensors 72, 73, 74, 75, 76, and 78 respectively) with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of several to tens of centimeters (cm) at relatively close ranges on the order of several to tens of meters, such as an accuracy of about +/−3 cm at 5 meters (m) and +/−13 cm at 10 m for stereoscopic cameras), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78.

In some embodiments, a calibration process can be performed to determine a set of transforms that can be used to convert a location from a local coordinate system used by a particular depth sensor (sometimes referred to herein as a camera coordinate system, although it can be a coordinate system used by another type of depth sensor, such as a lidar or sonar-based sensor) to the corresponding location in a global coordinate system used by vessel 10 (e.g., used to perform autonomous navigation processes, such as automatically guiding vessel 10 during docking, automatically guiding vessel 10 during trailer loading or unloading, automatically avoiding collisions with objects via a virtual bumper or buffer zone, autonomous navigation through areas that include other vessels and/or other obstacles, etc.). The camera coordinate system can define a local reference frame for a particular camera (or other type of depth sensor), and the global coordinate system can define a reference frame to which each camera (or other type of depth sensor) is calibrated, which can be referred to as a common reference frame, a global reference frame, or a world reference frame (note that the global coordinate system can be independent and distinct from the geographical coordinate system of latitude and longitude often used to designate locations on Earth).

In some embodiments, a camera coordinate system can be defined relative to a center of an imaging plane (e.g., with an origin at a center of the imaging plane, a depth axis extending perpendicular to the imaging plane, and lateral axes extending perpendicular to the depth axis) of the camera. In some embodiments, the camera coordinate system can use any suitable type of coordinate system, such as a 3D Cartesian coordinate system, a spherical coordinate system, a cylindrical coordinate system, etc. Note that the type of coordinate system used to define the camera coordinate system can vary based on the type of sensor being used. For example, depth cameras can use a Cartesian coordinate system that defines a depth axis (e.g., a z-axis) that extends perpendicular to the imaging plane of the camera (e.g., an imaging plane associated with an image sensor of the camera), and lateral coordinates (e.g., an x-axis and a y-axis) that extend parallel to the imaging plane and can be used to define the horizontal and vertical distance of a point from an optical axis of the camera. As another example, a scanning lidar that sweeps across a scene using a laser line or single laser point can use a cylindrical coordinate system that defines a depth axis (e.g., an r-axis) that extends perpendicular to the light detector(s) (e.g., an imaging plane associated with an area sensor, an imaging axis of a line sensor), and lateral coordinates (e.g., a z-axis and a θ coordinate) that can be used to define the angular distance (e.g., in degrees or radians) and vertical distance of a point from reference axes of the lidar system.

In some embodiments, a global coordinate system (sometimes referred to as global coordinates or world coordinates) can be defined relative to a particular point on vessel 10. For example, a coordinate system of a particular depth sensor can be used as the basis for the global coordinate system (e.g., a front-facing camera, such as depth sensor 72), and locations of points in an environment of vessel 10 can be defined based on the distance from an origin of that camera coordinate system. In such an example, an offset can be used to determine a location of a particular point on the vessel (e.g., a point of navigation, such as center of gravity (COG) or center of rotation (COR) of vessel 10). As another example, locations of points in an environment of vessel 10 can be defined based on the distance from a COG or COR of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensor's FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of proximity data produced by depth sensors 72-78, the connection between sensors 72-78 and sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network being used for communication by multiple devices. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, depth sensors 72-78 can include different types of imaging devices, having different types of sensors (e.g., depending on the distance between vessel 10 and an object, such as object O). For example, radar sensors can be used to detect objects at further distances, and cameras, sonic sensors, and/or lidar can be used for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view (e.g., as shown in FIG. 1). Note that optimal sensor positions can vary depending on vessel size and configuration. In some embodiments, one or more imaging devices can be position to have a field of view below a surface of the water (e.g., a sonar sensor, a side-scan sonar, etc.), to provide imaging of objects below a surface of the water.

In FIG. 1, the depth sensors shown are positioned to observe multiple regions around vessel 10, including the front, sides, and stern of vessel 10, and include a front-facing sensor 72, a front-starboard-facing sensor 73, a starboard-facing sensor 74, a front-port-facing sensor 73, a rear-facing sensor 76, a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10, such as where the hull obstructs the field of view). Note also that the relevant controller, such as sensor processor 70, can selectively operate any one or more of various different sensors (e.g., including depth cameras, radars, lidars, sonars, ultrasonics, or any other suitable imaging and/or sensor technology) to sense the location of objects in an environment of vessel 10.

In some embodiments, sensor processor 70 can integrate sensor data provided from one or more types of sensor into one or more models of an environment of vessel 10, objects within the environment, and/or vessel 10 itself. In such embodiments, the model(s) can be in any suitable format, such as one or more point clouds, one or more maps, one or more occupancy grids, and/or one or more data structures including a list of surrounding objects (e.g., including the object's size and position) integrating location information from multiple sensors. As described above, the location data from different imaging devices and/or sensors can be translated into a common reference frame (e.g., defined by the global coordinate system).

Autonomous and/or advanced operator assistance (sometimes referred to as semi-autonomous) controls for improved vessel handling qualities generally requires a relatively accurate ability to identify objects in an environment of vessel 10, often using multiple depth sensors mounted on vessel 10. In general, such depth sensors can be positioned to detect the objects in the marine environment surrounding marine vessel 10, such as a dock, another vessel, a swimmer, or other obstruction in the current path and/or other potential paths of vessel 10. Each sensor can provide location information of features within its field of view relative to its own frame of reference (e.g., in the camera coordinate system associated with that sensor) and/or in a common frame of reference (e.g., in the global coordinate system). For example, the location information can be transformed from the respective camera coordinates at the camera (or other imaging device) and/or at a controller (e.g., sensor processor 70) using one or more transforms derived during a calibration procedure. Depending on the type of sensor(s), the application of use, boat size, hull shape, etc., multiple sensor types and sensor locations may be required to provide adequate sensing around the marine vessel for operation in all marine environments. To create a cohesive dataset that can be used for purposes of vessel control and vessel navigation, including autonomous vessel navigation and automatic maneuver-limiting control (e.g., velocity limiting for object avoidance, maintenance of a buffer zone, etc.), information from multiple sources (e.g., multiple depth sensors, multiple types of depth sensors, proximity sensors, etc.), can be translated to a common reference frame. To accurately translate the information to the common reference frame typically requires precise knowledge of the posture (e.g., including 3D location, installation attitude, and/or orientation) of each sensor relative to the common reference frame such that the information received from each sensor can be translated appropriately. Regardless of what type of model(s) is being generated, the relevant sensor installation posture of each sensor on the marine vessel must be known so that the location information from each respective sensor can be properly interpreted for navigation purposes. Note that the installation posture of each sensor can be calculated or otherwise determined explicitly, however, such information is generally difficult to determine with sufficient accuracy. Alternatively, the installation posture of each sensor can be implicit in the transforms determined during a calibration procedure (e.g., transforms that are optimized using machine learning techniques may not require explicit knowledge of the location of the sensors). In some embodiments, a calibration procedure can begin with an initial estimate of camera poses (e.g., based on measurement and/or a CAD model), and the calibration procedure can include refining the initial estimate (e.g., via an optimization algorithm).

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system (e.g., a global navigation satellite system (GNSS)), such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data. In some embodiments, as shown in FIG. 1, depth data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy (BLE), Zig-Bee, ultra-wideband, etc.), a CAN bus comprising part of the vessel network, etc. Note that the dashed connection lines in FIG. 1 are meant to show only that the various control elements are capable of communicating with one another, and do not necessarily represent actual wiring connections between the control elements, nor do they represent the only paths of communication between the elements.

In some embodiments, some sensor processing functions can be performed by a separate computing device. For example, sensor processor 70 can communicate processed sensor data to central controller 24, which can utilize the processed data for navigation functions and/or other vessel control functions. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, controller 24 can also perform one or more sensor processing functions. Additionally or alternatively, in some embodiments, functions described herein as comprising part of the sensor processor functions can be distributed across two or more processing devices. For example, each depth sensor 72-78 can include one or more processors that are configured to perform certain functions (e.g., segmenting image data to classify one or more objects in the image, generate one or more RGBD images, generating one or more 3D depth maps, generating a point cloud corresponding to the 3D depth map, projecting points into a global coordinate system, etc.). As another example, each IMU 62-68 can include (or otherwise be associated with) one or more processors that are configured to perform calculations to interpret measured IMU data (such as to determine an attitude estimate for the respective IMU) and provide the interpreted IMU data to one or more other processing devices or controllers for execution of subsequent processing steps.

In some embodiments, a controller(s) (e.g., controller 24, sensor processor 70, etc.) can use any suitable information about the environment when planning a path for autonomous and/or semi-autonomous navigation. For example, the controller(s) can use an occupancy grid that has been generated and/or updated using proximity information measured by proximity sensors (e.g., proximity sensors 72-78). In some embodiments, the occupancy grid can be formatted as a data structure in which each element corresponds to a cell of the occupancy grid, and each element is indicative of a probability that the cell is occupied by an object/obstacle. In some embodiments, each cell can represent a volume of the environment (e.g., having a width, depth, and height). For example, each cell can represent a volume that is 0.25 meters (m) by 0.25 m laterally, and extends from a water surface to a height at or above the top of vessel 10 (e.g., 3 m from the water's surface, 5 m from the water surface, etc.). In some embodiments, vessel 10 can gather location information corresponding to objects in the environment during operation (e.g., using sensors 72-78), and can generate a model (e.g., using a point cloud) of objects in an environment around vessel 10 based on the location of the objects. The model of the objects in the environment can be used to identify cells in the occupancy grid that are more likely to contain an obstruction, and those that are less likely. For example, the model of the environment can be integrated over the volume of space represented by any particular occupancy grid cell, and can determine whether an object is located in that cell based on whether the model indicates the presence of an one or more objects within the volume (e.g., based on the number of point cloud points within the volume, based on the number of point cloud points within the volume excluding points corresponding to water, etc.).

In some embodiments, the controller(s) can update the occupancy grid in real-time based on recent measurements of a portion of the environment within a predetermined range of the proximity sensors(s). Portions of the occupancy grid that are out of that range can be maintained in memory (e.g., for use in planning a path through the portion of the environment represented by that portion of the occupancy grid in the future). In some embodiments, cells in the occupancy grid can be associated with local coordinates (e.g., based on the global coordinate system), and can be associated with a geographic coordinate system (e.g., latitude and longitude). In such an example, the local coordinates can be defined based on linear measurements indicating placement of the cell (e.g., distance from an origin along two or more axes) and/or radial measurements (e.g., radial distance from one or more axes). A transform can define a relationship between the local coordinates and the associated geographic coordinates. In some embodiments, when planning a path, the controller(s) can use the occupancy grid to identify portions of the environment that can be safely traversed and those that may result in a collision.

In some embodiments, an occupancy grid can include multiple layers (e.g., each cell can be associated with multiple elements) that indicate a probability that the cell is occupied by a particular type of object. For example, each cell can be associated with an element indicative of a probability of any object being present in the cell. As another example, each cell can be associated with an element indicative of a probability of a person (e.g., a swimmer, a snorkeler, etc.) being present in the cell. As yet another example, each cell can be associated with an element indicative of a probability of a powered boat being present in the cell. As yet another example, each cell can be associated with an element indicative of a probability of a human-powered vessel (e.g., a kayak, a canoe, a row boat, a paddle boat, a stand-up paddle board, etc.) being present in the cell. As yet another example, each cell can be associated with an element indicative of a probability of a small vessel (e.g., a boat or other powered vessel, such as a jet ski, under a particular size) being present in the cell. As still another example, each cell can be associated with elements indicative of a probability of other types of objects and/or obstructions being present in the cell, such as land, a dock, a structure (e.g., a bridge, a pier, a post, a piling, etc.), vegetation, floating vegetation, miscellaneous debris, floating logs, wildlife (e.g., a shark, a fish, a whale, a marine mammal, etc.) etc.

In some embodiments, information indicating a probability of an object occupying a cell can be based on any suitable information. For example, location information (e.g., based on measurements by proximity sensors 72-78) can be correlated with feature label information that identifies a classification of a feature. In some embodiments, the label information can be generated using any suitable technique or combination of techniques. For example, one or more images of an environment (e.g., color images) can be captured, and can be used to generate segmentation information (e.g., using a trained machine learning model), which can include classification information that indicates which of a set of classes different portions of the image are most likely to correspond. In some embodiments, the set of classes can include classes that are relatively likely for the vessel to encounter (e.g., in a marine environment). As another example, one or more images of an environment can be captured, and can be used to generate object detection information (e.g., using a trained machine learning model), which can include classification information that indicates which of a set of classes particular portions of the image are most likely to correspond (e.g., instances of a particular class of the set of classes). In some embodiments, classification information associated with objects in the environment can be associated with portions of a model used to represent the environment. For example, points in a point cloud can be assigned a label based on a classification of an object at that position. Additionally, in some embodiments, the classification information can include a confidence that the label is accurate (e.g., a probability of the portion of the image being an instance of the class corresponding to the label). In some embodiments, such a label can be used to determine a likelihood that a particular type of object is located at different points in the environment. For example, if a volume of the environment corresponding to a particular cell of an occupancy grid includes points labeled as person, a layer of the occupancy grid corresponding to people can include an element corresponding to a likelihood that a person is present in that portion of the environment based on the label. As another example, if a volume of the environment corresponding to a particular cell of an occupancy grid includes points labeled as a power driven vessel, a layer of the occupancy grid corresponding to power driven vessels can include an element corresponding to a likelihood that a power driven vessel is present in that portion of the environment based on the label.

In some embodiments, as vessel 10 traverses a path (e.g., a path planned by the controller(s), a current path set by an operator, etc.), the controller(s) can periodically (e.g., at regular and/or irregular intervals) project a model of vessel 10 forward along the path a predetermined distance to determine whether vessel 10 is likely to collide with any obstacles that may have obstructed the planned path (and/or that a sensor(s) may have detected the presence of) since the path was planned. For example, at a predetermined rate (e.g., once per second, twice per second, etc.), the controller(s) can determine whether a cell of the occupancy grid which vessel 10 (e.g., including a buffer area) is predicted to traverse is occupied. If the controller(s) determines that a cell of the occupancy grid that vessel 10 is predicted to traverse is occupied, the controller(s) can initiate replanning of a route that avoids that cell and/or can control propulsion of vessel 10 to avoid colliding with the object (e.g., by slowing down, stopping, reversing, etc.). Additionally or alternatively, in some embodiments, if vessel 10 is not being actively operated (e.g., the vessel is adrift, anchored, or moored), as vessel 10 traverses an unplanned path (e.g., due to environmental forces, such as wind, current, tide, etc.) the controller(s) can periodically (e.g., at regular and/or irregular intervals) project a model of vessel 10 forward along a recent path a predetermined distance (e.g., in time and/or space) to determine whether vessel 10 is likely to collide with any obstacles that may have obstructed the current path (and/or that a sensor(s) may have detected the presence of) since the path was last updated. For example, at a predetermined rate (e.g., once per second, twice per second, etc.), the controller(s) can determine whether a cell of the occupancy grid which vessel 10 (e.g., including a buffer area) is predicted to traverse is occupied.

In some embodiments, as vessel 10 traverses a planned or unplanned path, the controller(s) can periodically (e.g., at regular and/or irregular intervals) project a model of other moving objects in the environment (e.g., other vessels) forward along an observed path of the object a predetermined distance to determine a likely path of the object in the future (e.g., whether the object is likely to collide with, or otherwise impact the safety of, vessel 10, a swimmer associated with vessel 10, etc.). For example, at a predetermined rate (e.g., once per second, twice per second, etc.), the controller(s) can determine whether an object moving through the environment (e.g., represented in one or more cells of an occupancy grid) is predicted to pass within a predetermined distance from vessel 10 and/or any other suitable object (e.g., a swimmer). As described below, if the controller(s) determines that an object is likely to impact safety of vessel 10 and/or a swimmer associated with vessel 10, the controller(s) can cause an alert to be presented one or more users (e.g., a captain, a user that is swimming, etc.) to mitigate a risk of the object adversely impacting the safety of vessel 10 and/or users of vessel 10.

In some embodiments, each processor (e.g., a processor of one or more of control modules 24, 26*a*, 26*b*) can access computer-readable code and, upon executing the code, carry out one or more functions, such as proximity measurement functions, autonomous navigation functions, environmental modeling functions, safety monitoring functions, etc., as described in more detail below. In some embodiments, sensor processor 70 can be a dedicated, special-purpose computing system configured to process depth data and/or IMU data from depth sensors (e.g., depth sensors 72-78), sensor IMUs (e.g., IMUs 62-68, and/or main IMU 36), and/or generate image data (e.g., which can be used to present a portion of an XR scene).

In some embodiments, mechanisms described herein can be configured to use information from one or more of depth sensor 72-78 to monitor an environment of vessel 10 and detect hazards in the marine environment that may impact the safety of users in the water, and warn one or users when a relevant hazard is detected (e.g., a hazard that is likely to impact safety of a user in the water). For example, as described below in connection with FIGS. 3-6, mechanisms described herein can use data generated by a vision system of vessel 10 to detect objects (e.g., other vessels, potentially dangerous wildlife, etc.) that may impact safety of a user in the water. In such an example, mechanisms described herein can be used to monitor the environment, and determine when an object in the environment is likely to approach, and/or is, within a predetermined distance of a user in the water (e.g., a swimmer), and take action to inform the user in the water and/or other users (who may or may not be in the water) of an approaching hazard with sufficient time to mitigate a risk presented by the hazard.

As another example, as described below in connection with FIGS. 3-6, mechanisms described herein can cause an alert to be presented to one or more users when an object in the environment may impact safety of a user in the water within a predetermined period of time. In such an example, an alert can be presented using a device (e.g., a wearable device, a carried device, a mobile computing device, etc.) associated with a particular user that may be impacted by the potentially hazardous object. Additionally or alternatively, an alert can be presented using an output device of vessel 10 (e.g., a display(s), a speaker(s), a sound producing device, etc.).

As another example, as described below in connection with FIGS. 3-6, mechanisms described herein can cause an alert to be transmitted and/or presented to an approaching vessel that may pose a risk to a user that is in the water. In such an example, an alert can be transmitted and/or presented using any suitable technique (e.g., a V2V message transmitted to the vessel, a V2E message broadcast to devices in range, etc.), and/or device.

In some embodiments, sensor processor 70 (and/or any other suitable processor(s)) can be programmed and/or otherwise configured to automatically perform an environmental monitoring and/or warning process, in which sensor processor 70 (and/or any other suitable processor(s)) can detect hazardous objects when a user is in the water, and warn the user (and/or others). For example, as described below in connection with FIGS. 3-6, sensor processor 70 (and/or any other suitable processor(s)) can utilize a model of the environment (e.g., a 2D and/or 3D model) to identify potentially hazardous objects, determine whether the potentially hazardous objects are predicted to impact a user(s) in the water, and mitigate a risk presented by the object (e.g., via an alert presented to the user in the water, a user on the vessel, or a person associated with the object, such as an operator of another vessel that is predicted to impact the user(s) in the water).

Figure 2:
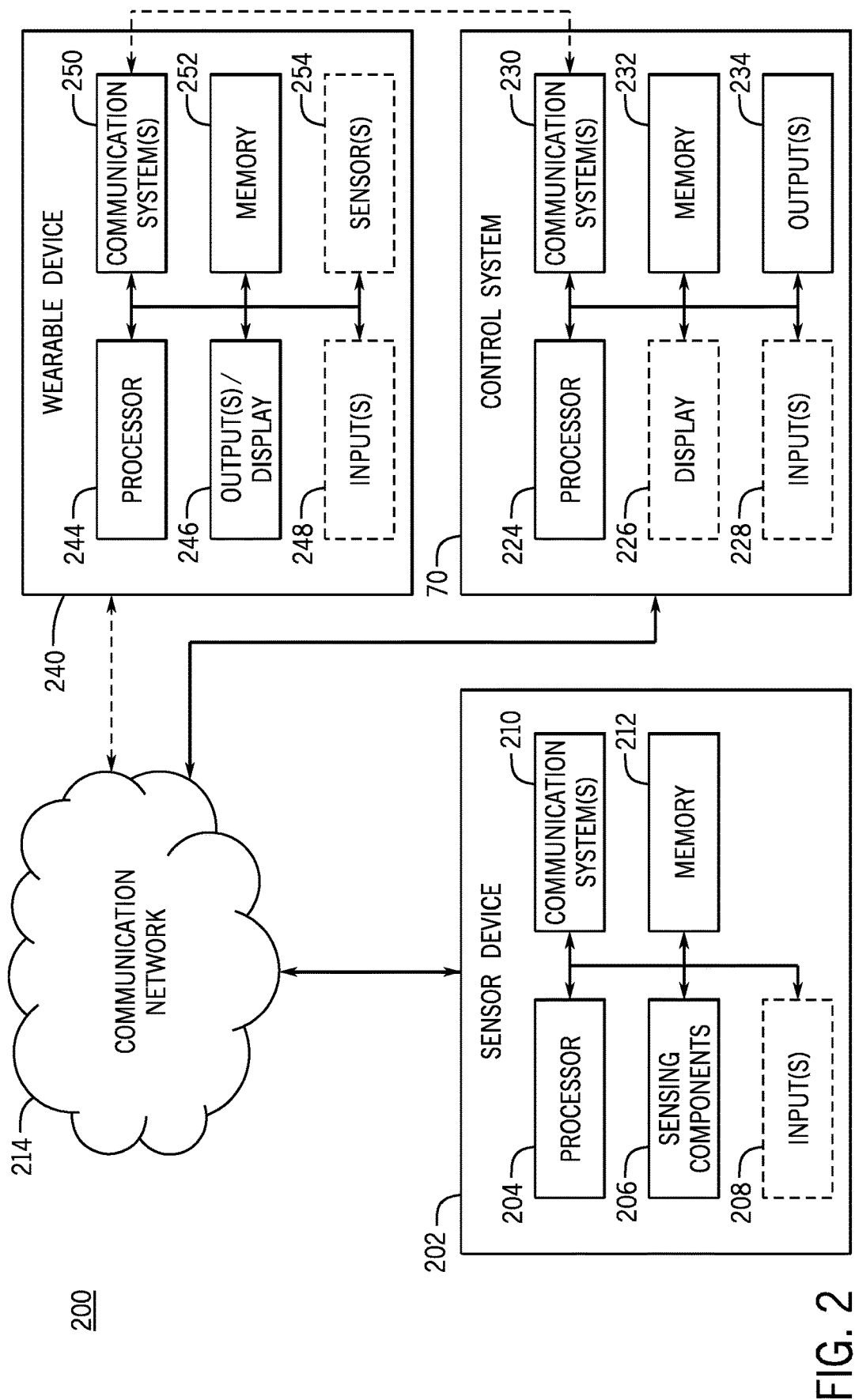
FIG. 2 shows an example of hardware that can be used to implement a sensor device, a control system, and a wearable device in accordance with some embodiments of the disclosure.

FIG. 2 shows an example of hardware 200 that can be used to implement a sensor device 202 sensor processor 70, and a wearable device 240 in accordance with some embodiments of the disclosed subject matter.

As shown in FIG. 2, in some embodiments, sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to determine a three-dimensional location of an object and/or other feature of an environment (e.g., a water surface) that is within a field of view of the sensor device 202, and/or to capture image data of a scene within a field of view of the sensor device 202. In some embodiments, sensor device 202 can include components used to implement one or more of depth sensors 72-78.

For example, sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, sensor device 202 can be implemented as one or more lidar devices (e.g., a scanning lidar, a lidar including a 2D array sensor, etc.) that include components that facilitate three-dimensional characterization of a region of an environment. In such an example, a camera(s) (e.g., a two-dimensional camera) can be located to have an overlapping field of view with a lidar device (e.g., such a camera can be co-located), and can be used to capture images that can be used to classify portions of the environment (e.g., using a machine learning model trained to perform image segmentation). As yet another example, sensor device 202 can be implemented as one or more sound-based devices (e.g., one or more sonar systems, such a side-scanning sonar system, etc.) that include components that facilitate three-dimensional characterization of a region of an environment. As still another example, sensor device 202 can be implemented as one or more radio wave-based devices (e.g., one or more radar systems, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, sensor device 202 can omit inputs (e.g., where depth sensor device is an embedded device, or where depth sensor device is not configured for direct end user operation).

In some embodiments, communication system(s) 210 can include any suitable hardware, firmware, and/or software for communicating information over a communication network 214 and/or any other suitable communication networks. For example, communication system(s) 210 can include one or more transceivers, one or more communication chips and/or chip sets, etc., that can be used to establish a wired and/or wireless communication link. In a more particular example, communication system(s) 210 can include hardware, firmware, and/or software that can be used to establish a direct or indirect wired connection and/or a direct or indirect wireless connection, such as a CAN bus connection, a Bluetooth connection, Bluetooth Low Energy (BLE) connection, a ZigBee connection, a Wi-Fi connection, a cellular connection (e.g., an uplink connection, a downlink connection, or a sidelink connection), an ultra-wideband (UWB) connection, an Ethernet connection, etc.

In some embodiments, memory 212 can include any suitable storage device or devices that can be used to store instructions, values, etc., that can be used, for example, by processor 204 to generate depth information of a portion of the environment that characterizes the portion of the environment in three-dimensions, to identify and/or classify one or more objects and/or other features in a scene based on the depth information and/or image information, to communicate with sensor processor 70 (and/or any other suitable control system) via communications system(s) 210, etc. Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, in addition to, or in lieu of, hardware, firmware, and/or software for communicating using radio waves, communication system(s) 210 can include one or more transmitters and/or receivers configured to communicate using one or more other communication modalities (e.g., sound-based communication, light-based communication, etc.), such as a transducer (e.g., for implementing sound-based communication), or a light sensor and light source (e.g., for implementing light-based communication).

In some embodiments, sensor device 202 can include any suitable display device(s) (not shown), such as a computer monitor, a touchscreen, a television, etc.

In some embodiments, memory 212 can have encoded thereon a computer program for controlling operation of depth sensor device 202. In such embodiments, processor 204 can execute at least a portion of the computer program to generate depth information, to identify and/or classify one or more objects and/or other features in a scene based on the depth information and/or image information, to transmit information to control system 230 (and/or any other suitable control system), to execute at least a portion of a process for detecting and/or warning users of hazards in a marine environment using a vision system of a marine vessel, such as processes described below in connection with FIGS. 4-6, etc.

In some embodiments, communication network 214 can be any suitable communication network or combination of communication networks. For example, communication network 214 can include a Wi-Fi network (which can include one or more wireless routers, one or more switches, etc.), a peer-to-peer network (e.g., a Bluetooth network, a UWB network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, UWB links, cellular links, etc.

In some embodiments, a control system 220 can include a processor 224, a display 226, one or more inputs 228, one or more communication system(s) 230, memory 232, and/or one or more output devices 234. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. In some embodiments, inputs 228 can include any suitable input devices and/or sensors that can be used to receive user input, such as a keyboard, a mouse, a touchscreen, a microphone, etc. In some embodiments, control system 220 can omit display 226 and/or inputs 228 (e.g., where control system 220 is an embedded device that is not configured for direct user interaction). For example, control system 220 can provide results of an analysis, image data, and/or a portion of a user interface to CCM 24, and CCM 24 can use the results, image data, and/or user interface to present an alert, image data, model data, autonomy data, etc. In some embodiments, any suitable controller and/or control module (e.g., CCM 24, sensor processor 70, and/or any other suitable control system) can be used to implement control system 220.

In some embodiments, communication system(s) 230 can include any suitable hardware, firmware, and/or software for communicating information over communication network 214 and/or any other suitable communication networks. For example, communication system(s) 230 can include one or more transceivers, one or more communication chips and/or chip sets, etc., that can be used to establish a wired and/or wireless communication link. In a more particular example, communication system(s) 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a UWB connection, a Wi-Fi connection, a cellular connection (e.g., an uplink connection, a downlink connection, or a sidelink connection), an Ethernet connection, etc. In some embodiments, in addition to, or in lieu of, hardware, firmware, and/or software for communicating using radio waves, communication system(s) 230 can include one or more transmitters and/or receivers configured to communicate using one or more other communication modalities (e.g., sound-based communication, light-based communication, etc.), such as a transducer (e.g., for implementing sound-based communication), or a light sensor and light source (e.g., for implementing light-based communication).

In some embodiments, memory 232 can include any suitable storage device or devices that can be used to store instructions, values, etc., that can be used, for example, by processor 224 to analyze image data and/or depth information received from depth sensor device 202 (and/or any other suitable depth sensor device), to identify and/or classify one or more objects and/or other features in a scene based on the depth information and/or image information, to communicate with depth sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, etc.

In some embodiments, memory 232 can have encoded thereon a computer program for controlling operation of control system 220. In such embodiments, processor 224 can identify hazards in an environment that may impact safety of a user in the water, cause an alert to be presented to a user(s) based on the presence of a hazard, to receive information from sensor device 202, to execute at least a portion of a process for detecting and/or warning users of hazards in a marine environment using a vision system of a marine vessel, such as processes described below in connection with FIGS. 4-6, etc.

In some embodiments, wearable device 240 can include a processor 244, an output(s)/display 246, one or more inputs 248, one or more communication system(s) 250, memory 252, and/or one or more sensors 254. In some embodiments, processor 244 can be any suitable hardware processor or combination of processors, such as a CPU, an APU, a GPU, an FPGA, an ASIC, etc.

In some embodiments, display/output(s) 246 can include any suitable display device(s), such as a transparent display or a non-transparent display configured to present a visual alert. For example, display 246 can be any suitable display (s) integrated into, and/or in communication with, a wearable device (e.g., a watch face, a display panel, etc.). In a more particular example, display 246 can be implemented using a segmented display (e.g., a seven-segment display) implemented using a technology such as liquid crystal display (LCD) segments, light emitting diode (LED) segments, etc. As another more particular example, display 246 can be implemented using an LCD panel, an LED panel, an organic LED (OLED) panel, an electronic paper panel, etc., that includes an array of addressable light emitting elements that can be modulated between at least two states, such as an on and off state (e.g., emitting and/or transmitting in an on state, and not emitting and/or blocking light in an off state), or a dark and light state (e.g., presenting a light and/or reflective surface in a light state, and a dark and/or light absorbing surface in a dark state). As another example, display 246 can be any suitable display(s) integrated into a head mounted device (e.g., swimming goggles, a snorkel mask, a diving mask, etc.). In a more particular example, display 246 can be a transparent and/or heads up display configured to present information to a wearer.

In some embodiments, display/output(s) 246 can include any suitable output device(s) (e.g., an indicator light(s), a haptic feedback device, a speaker(s), etc.) to present an alert that can be perceived by a person (e.g., light in the visible portion of the spectrum, sound within an audible range of frequencies, tactile vibration that is perceptible by a person, etc.). For example, output 246 can be implemented using a haptic feedback device (e.g., implemented using an eccentric rotating mass (ERM) actuator(s), using one or more piezoelectric actuators, etc.) integrated into wearable device 240, and configured to be in contact with a portion of a wearers body, and vibrate in response to a signal from processor 244. As another example, output 246 can be implemented using an indicator light (e.g., implemented using an LED(s)) integrated into wearable device 240, and configured to be viewable by a wearer (e.g., in a field of view of the wearer, such as integrated into goggles, a mask, etc.; on an easily viewable portion of the body, such as a wrist, hand, etc.). As yet another example, output 246 can be implemented using a sound generating device (e.g., a speaker, an underwater speaker, a bone conduction device, etc.) integrated into wearable device 240, and configured to be audible to a wearer (e.g., to transmit sound toward a wearer's ear canal, to transmit sound via bone conduction to a wearer's inner ear, to transmit sound that reaches a wearer's ear canal, etc.).

In some embodiments, inputs 248 can include any suitable input device(s) and/or sensor(s) that can be used to receive user input, such as a gaze tracking system, a touchscreen, a trackpad, one or more buttons, a microphone, a keyboard, a mouse, etc.

In some embodiments, wearable device 240 can omit inputs (e.g., where wearable device 240 operates as an output for, and/or is paired with, another device, such as sensor processor 70, CCM 24, a smartphone, a tablet computer, a laptop computer, etc.). For example, wearable device 240 can receive instructions from control system 220, and can generate an alert (e.g., via output(s)/display 246) in response to the instructions.

In some embodiments, communication system(s) 250 can include any suitable hardware, firmware, and/or software for communicating information over communication network 214 and/or any other suitable communication networks. For example, communication system(s) 250 can include one or more transceivers, one or more communication chips and/or chip sets, etc., that can be used to establish a wired and/or wireless communication link. In a more particular example, communication system(s) 250 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a UWB connection, a Wi-Fi connection, a cellular connection (e.g., an uplink connection, a downlink connection, or a sidelink connection), an Ethernet connection, etc. In some embodiments, in addition to, or in lieu of, hardware, firmware, and/or software for communicating using radio waves, communication system(s) 250 can include one or more transmitters and/or receivers configured to communicate using one or more other communication modalities (e.g., sound-based communication, light-based communication, etc.), such as a transducer (e.g., for implementing sound-based communication), or a light sensor and light source (e.g., for implementing light-based communication). In some embodiments, communication system(s)

250 can be configured to communicate directly with control system 220 (e.g., note that although a direct connection is shown as being outside of communication network 214, a direct connection can be part of communication network 214, for example, if used to relay information from an end point other than control system 220 to wearable device 240). For example, such a connection can be a two-way communication link between wearable device 240 and control system 220, such as a Bluetooth connection, a UWB connection, a sidelink connection, etc. As another example, such a connection can be a one-way communication link from control system 220 to wearable device 240.

In some embodiments, memory 252 can include any suitable storage device or devices that can be used to store instructions, values, etc., that can be used, for example, by processor 244 to generate an alert via output(s)/display 246, receive input via input(s) 248, to communicate with control system 220 and/or sensor device 202 via communications system(s) 250, etc. Memory 252 can include any suitable volatile memory, non-volatile memory, storage, or any suitable combination thereof. For example, memory 252 can include RAM, ROM, EEPROM, one or more flash drives, one or more hard disks, one or more solid state drives, one or more optical drives, etc.

In some embodiments, sensor(s) 254 can include components that are used to measure data about a user and/or an environment, such as whether the wearable device is submerged in water, sound received at the wearable device, light received at the wearable device, depth of the wearable device, biometrics of a wearer (e.g., heartrate, blood oxygen, etc.), a position of the wearable device, etc. For example, sensor(s) 254 can include a sensor (e.g., a conductive, capacitive, and/or optical sensor) configured to determine whether wearable device 240 is submerged in water. As another example, sensor(s) 254 can include a pressure sensor configured to configured to determine a depth of wearable device under a surface of the water. As yet another example, sensor(s) 254 can include a sound sensor configured to detect sound transmitted through air (e.g., a microphone, an ultrasonic transducer, etc.), and/or configured to detect sound transmitted through water while submerged in water (e.g., a hydrophone, an ultrasonic transducer, etc.). As still another example, sensor(s) 254 can include a GPS receiver configured to determine a location of the wearable device. As a further example, sensor(s) 254 can include a light detector(s) (e.g., a CMOS-based detector, a single-photon avalanche diode (SPAD)-based detector, etc.) configured to detect light-based signals (e.g., a particular color(s) within the visible spectrum, a specific wavelength(s) outside the visible spectrum, etc.).

In some embodiments, memory 252 can have encoded thereon a computer program for controlling operation of wearable device 240. In such embodiments, processor 244 can execute at least a portion of the computer program to receive and/or detect a signal(s) transmitted from vessel 10 (e.g., via communication system(s) 230 and/or output(s) 234), present an alert, to receive information from control system 220, to transmit information to control system 220, to execute at least a portion of a process for detecting and/or warning users of hazards in a marine environment using a vision system of a marine vessel, such as processes described below in connection with FIGS. 4-6, etc.

In some embodiments, wearable device 240 can be implemented with any suitable form factor and/or can be configured to be worn on any portion of a person's body, and/or affixed to an item worn on any portion of a person's body. For example, wearable device 240 can be implemented as a wearable fob (e.g., worn on a wrist, affixed to a waistband, affixed to a worn lanyard, etc.). In a more particular example, wearable device 240 can have a similar form factor to wireless fobs such as 1ST MATE devices available from BRUNSWICK CORP. As another example, wearable device 240 can be implemented as a device worn on the wrist or hand (e.g., a watch, a bracelet, a ring, a glove, etc.). As another example, wearable device 240 can be implemented into, and/or affixed to, a head mounted form factor (e.g., goggles, a mask, ear plug, head phones, etc.). As still another example, wearable device 240 can be implemented into, and/or affixed to, a personal floatation device (e.g., a life jacket, life vest, etc.).

Figure 3:
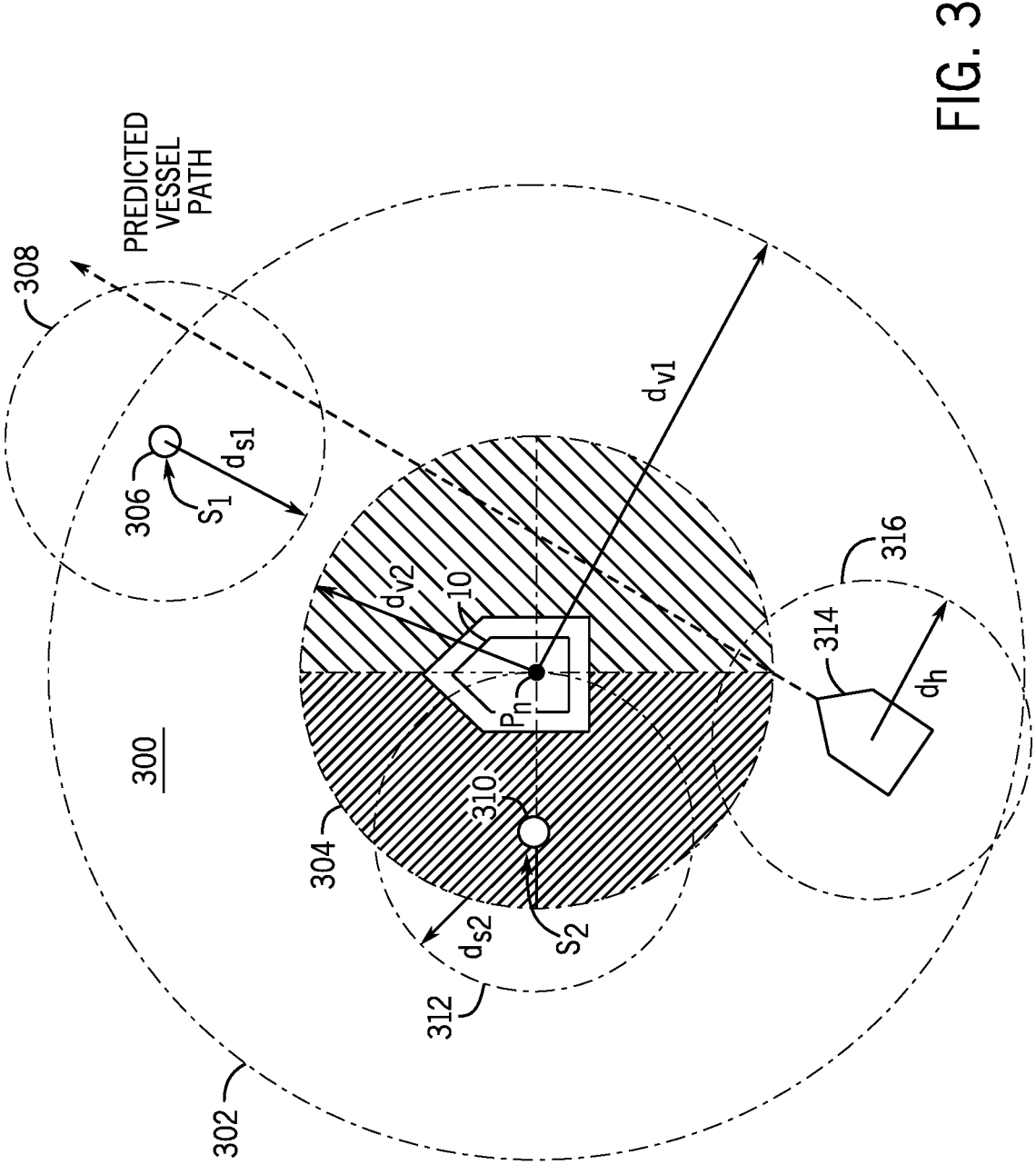
FIG. 3 shows an example of an environment in which a marine vessel can execute a process for detecting and warning users of hazards in a marine environment using a vision system of a marine vessel in accordance with some embodiments of the disclosed subject matter.

FIG. 3 shows an example of an environment 300 in which a marine vessel can execute a process for detecting and warning users of hazards in a marine environment using a vision system of a marine vessel in accordance with some embodiments of the disclosed subject matter.

In some embodiments, vessel 10 (e.g., via control system 220) can monitor environment 300 for objects that may impact safety of one or more users that may be in the water. For example, in the example of FIG. 3, two users are in the water (referred to as swimmers $s_1$ and $s_2$, respectively). Note that this is an example, there may be more or fewer users in the water. In some embodiments, vessel 10 can monitor a particular area, or areas, for potentially hazardous objects that may impact safety of one or more users. For example, vessel 10 can monitor an area 302 around vessel 10 for objects that are potentially hazardous to swimmers and/or other users in the water. Note that area 302 can have any suitable shape and/or size. In a particular example, area 302 can have an area that roughly corresponds to an accurate range of a vision system (or one or more components of a vision system) of vessel 10. In another more particular example, as shown in FIG. 3, area 302 can be a circular area around vessel 10 having a radius $d_{v1}$ (e.g., 10 meters (m), 25 m, 50 m, more than 50 m, etc.).

As another example, vessel 10 can monitor a relatively small area 304 (e.g., smaller than area 302) around vessel 10 for objects that are potentially hazardous to swimmers and/or other users in the water. In a more particular example, vessel 10 can monitor area 304 for a set of potential hazards (e.g., including dangerous wildlife, power driven vessels, relatively fast moving objects that are not power driven vessels, etc.), and can monitor area 302 for a subset of potential hazards (e.g., power driven vessels). In such an example, a vision system of vessel 10 may be capable of reliably identifying relatively large objects and/or objects above a surface of the water at a greater range (e.g., corresponding to area 302) than smaller object and/or objects below a surface of the water, which the vision system may be capable of reliably identifying at a closer range (e.g., corresponding to area 304). In such an example, area 304 can have an area that roughly corresponds to a range at which a vision system (or one or more components of a vision system) of vessel 10 can relatively reliable (e.g., with greater than 50% confidence) identify dangerous wildlife that is generally found underwater. In another more particular example, as shown in FIG. 3, area 304 can be a circular area around vessel 10 having a radius $d_{v2}$ (e.g., 2 m, 3 m, 5 m, 10 meters, 25 m, etc.). Note that the size of areas 302 and/or 304 can vary based on various characteristics of the vision system of vessel 10 and/or characteristics of the environment (e.g., environment 300). For example, a vision system that includes radar may be capable of detecting large objects above the water (e.g., floating marine vessels) at longer range than a vision system that exclusively uses cameras. As another example, a vision system that includes sonar (e.g., side-scanning sonar) may be capable of detecting objects underwater at greater range than a vision system that exclusively uses cameras. As yet another example, in environments with reduced visibility and/or reduced ambient light (e.g., in foggy or misty conditions, in overcast conditions, at sunset, at dusk, at night, etc.), the size of area 302 and/or 304 may be reduced. As yet another example, in environments with clearer water and/or shallower water a size of an underwater area (e.g., area 304) that can be monitored (e.g., for potentially dangerous wildlife) can be larger than in environments with less clear water and/or deeper water (e.g., when using visible light cameras to attempt to detect hazards that are primarily underwater). Other environmental characteristics and/or characteristics of the vision system can also impact a range of a vision system, such as an angle of the sun with respect to an imaging device (e.g., which can cause glare from a water surface, saturation of pixels imaging the sun, etc.), a background (e.g., it may be more difficult to detect hazards against a background with land and/or vegetation on the horizon than against a background with sky on the horizon).

In some embodiments, vessel 10 can estimate a location of users in the water, such as users $s_1$ and $s_2$, using any suitable technique or combination of techniques. For example, as described below in connection with FIG. 6, vessel 10 can use image data captured by a vision system of vessel 10 to estimate a location of a user in the water. As another example, as described below in connection with FIG. 6, vessel 10 can estimate a location of a user in the water based on a signal received from a device worn by the user (e.g., an instance of wearable device 240). In FIG. 3, an estimated location of swimmers $s_1$ and $s_2$ are shown as circles 306 and 310, respectively. In some embodiments, circle 306 and/or circle 310 can represent an approximate location of a user in the water, and the size of the circle (e.g., a radius of the circle) can vary based on an accuracy of the estimation (e.g., estimations based on image data can be expected to be more accurate at closer range, estimates based on wireless communications can be expected to be more accurate with more measurements, etc.), a time since the location of the user was estimated (e.g., if a user cannot be observed and/or a signal from a wearable device associated with the user is not received, the user may have moved, increasing uncertainty of the users position), distance from vessel 10. etc.

In some embodiments, a user in the water (e.g., each user in the water identified by vessel 10) can be associated with a safety area around the user. Such an area can be defined using any suitable technique, and/or any suitable shape. For example, in FIG. 3, a safety area 308 associated with swimmer $s_1$ is shown as a circle centered on estimated location 306, with a radius of a distance $d_{s1}$, and a safety area 312 associated with swimmer $s_2$ is defined as a circle centered on estimated location 310, with a radius of a distance $d_{s2}$. As another example, a safety area (e.g., safety area 308, safety area 312) can correspond to a circle with a radius equal to a sum of the distance (e.g., $d_{s1}$ or $d_{s2}$) and a radius of the estimated location (e.g., a radius of 306 or 310).

In some embodiments, vessel 10 can attempt to determine a relatively precise location of a user, as shown in FIG. 3 as in approximate locations 306 and 310. Additionally or alternatively, in some embodiments, vessel 10 can attempt to determine a more general location of a user(s) (e.g., relative to vessel 10). For example, vessel 10 can attempt to determine on which side of vessel 10 a user is located (e.g., a starboard side or a port side, and/or forward or aft of the vessel). In a more particular example, as shown in FIG. 3, vessel 10 can attempt to determine whether a user is on a starboard side, illustrated as an area with a pattern of lines running from the lower left to upper right in FIG. 3, or on a port side, illustrated as an area with a pattern of lines running from the lower right to upper left in FIG. 3. As another more particular example, as shown in FIG. 3, vessel 10 can attempt to determine whether a user is fore of vessel 10, illustrated as an area with patterned lines without background shading in FIG. 3, or aft of vessel 10, illustrated as an area with patterned lines with background shading in FIG. 3. As another example, vessel 10 can attempt to determine in which quadrant of an area around vessel 10 a user is located (e.g., in a fore-starboard quadrant, a fore-port quadrant, an aft-starboard quadrant, or an aft-port quadrant). In some embodiments, a safety area associated with a more general user location (e.g., a side of vessel 10, a quadrant, etc.) can be an area of the estimated location, or a subset of the area (e.g., the port side, the fore-port quadrant, etc.).

In some embodiments, if a potentially hazardous object (e.g., a power driven vessel, dangerous wildlife, etc., such as vessel 314) is within, or is predicted to cross, a safety area associated with a user in the water, vessel 10 can determine that the object is likely to impact safety of the user. In some embodiments, a size of the safety area (e.g., distance $d_{s1}$ and/or distance $d_{s2}$) can vary based on one or more factors. For example, the size of the safety area (e.g., safety area 308 or safety area 310) can increase with uncertainty in a location of the user. As another example, the size of the safety area (e.g., safety area 308 or safety area 310) can increase with a distance between vessel 10 and the estimated location of the user.

Additionally or alternatively, in some embodiments, if a potentially hazardous object (e.g., a power driven vessel, dangerous wildlife, etc., such as vessel 314) is within, or is predicted to cross, area 304, vessel 10 can determine that the object is likely to impact safety of the user in the water (e.g., as the object is likely to be close to a user in the water, and/or is likely to come between the user in the water and the safety of vessel 10). As another example, if a potentially hazardous object (e.g., a power driven vessel, dangerous wildlife, etc., such as vessel 314) is within, or is predicted to cross, area 304, vessel 10 can determine that the object is likely to impact safety of the user in the water when the object is within, or is predicted to cross, the same area as the user in the water (e.g., the starboard side, fore of vessel 10, an aft-port quadrant, etc.). As yet another example, if a potentially hazardous object (e.g., a power driven vessel, dangerous wildlife, etc., such as vessel 314) is within, or is predicted to cross, area 302, vessel 10 can determine that the object is likely to impact safety of the user in the water when the object is within, or is predicted to cross, the same area as the user in the water (e.g., the starboard side, fore of vessel 10, an aft-port quadrant, etc.). As still another example, if a potentially hazardous object (e.g., a power driven vessel, dangerous wildlife, etc., such as vessel 314) is within, or is predicted to cross, area 302, vessel 10 can determine that the object is likely to impact safety of the user in the water if a location of the user in the water cannot be estimated.

In some embodiments, vessel 10 can predict and/or project a path of an object, such as vessel 314 based on observed movements of the object over a predetermined period of time. For example, vessel 10 can determine a velocity (e.g., a direction and speed of travel) of the object based on movement of the object over at least a predetermined period of time (e.g., an average velocity since the object entered a range of the vision system; an average velocity since the velocity of the object changed significantly, such as a change of ±5%, 10% in speed and/or 5°, 10° in heading; a most recent predetermined period of time, such as 3 seconds (s), 5 s, 10 s, 15 s, 30 s, etc. of movement; etc.), and can project the position based on the measured velocity for at least a predetermined time (e.g., 30 s, 60 s, 5 minutes, etc.), and/or a predetermined distance (e.g., based on distance $d_{v1}$, such as $2d_{v1}$). In some embodiments, vessel 10 can use the predicted and/or projected path of the object to determine whether the object is likely to impact the safety of one or more users in the water (e.g., to determine whether the object is a hazard that causes vessel 10 to present an alert to the users in the water, a user on vessel 10, and/or another vessel(s), such as vessel 314).

In some embodiments, vessel 10 can determine whether a potentially hazard object is likely to impact the safety of one or more users in the water based on a predicted and/or projected path of the object, and an area around the predicted and/or projected path of the object. For example, an object can be associated with a surrounding hazardous area that can reflect a relatively safe distance from object, and/or uncertainty in a path of the object. In a particular example, as shown in FIG. 3, vessel 314 can be associated with a surrounding area 316 (e.g., shown as a circle centered on a location of vessel 314, with a radius of a distance $d^h$). In some embodiments, a size of a hazardous area around an object (e.g., area 316 around vessel 314) can be based on any suitable characteristic(s) of the object and/or environment. For example, an object that is moving more quickly can be associated with a larger hazardous area. In such an example, the larger area can reflect an expected impact of the object based on the velocity of the object and/or a classification of the object. In a more particular example, a power driven vessel that generates a wake can impact safety of a user from a greater distance, due to the potential impact of the wake, and a vessel that is moving more quickly can be generally expected to generate a larger wake. Additionally or alternatively, in such an example, the larger area can reflect a reduced likelihood that an operator of a vessel notices a person in the water with sufficient time to slow down and/or change course in time to avoid negatively impacting the safety of the person in the water. Additionally or alternatively, in such an example, the larger area can reflect larger uncertainty in the predicted and/or projected path of the object, as a relatively small change in course or speed can cause a relatively large change in the path of the vessel over time.

As another example, a larger object that is moving relatively quickly can be associated with a larger hazardous area. As a more particular example, a larger power driven vessel can be expected to generate a larger wake with respect to a smaller power driven vessel at the same speed.

In some embodiments, a size of a hazardous area around the predicted and/or projected path of the object can increase as the difference in time between the prediction and/or projection and the current time increases. For example, a size of area 316 can increase as the projection moves forward in time, which can reflect uncertainty in a path of vessel 314. In such an example, a hazardous area associated with a predicted and/or projected path of an object can form a cone-like shape with an increasing width.

In some embodiments, if a location of a user (or a safety area around a user) is in a predicted and/or projected path of a hazardous object and/or within a hazardous area around the predicted and/or projected path, vessel 10 can determine that the object is likely to impact safety of the user in the water. For example, if a hazardous area around the predicted and/or projected path (e.g., by drawing a shape by projecting 316 along the predicted and/or projected path) includes or overlaps a location of a user in the water (e.g., location 306 or 310), vessel 10 can determine that the object is likely to impact safety of the user in the water. As another example, if a hazardous area around the predicted and/or projected path (e.g., by drawing a shape by projecting 316 along the predicted and/or projected path) includes or overlaps a safety area around a user in the water (e.g., safety area 308 or 312), vessel 10 can determine that the object is likely to impact safety of the user in the water. As yet another example, if a hazardous area around the predicted and/or projected path (e.g., by drawing a shape by projecting 316 along the predicted and/or projected path) includes or overlaps an area where a user in the water is estimated to be located (e.g., the starboard side, fore of vessel 10, an aft-port quadrant, etc.), vessel 10 can determine that the object is likely to impact safety of the user in the water (e.g., if a more precise location of a user was not, or cannot be, estimated). As still another example, if a hazardous area around the predicted and/or projected path (e.g., by drawing a shape by projecting 316 along the predicted and/or projected path) includes or overlaps an area around vessel 10 where a user may be in the water (e.g., area 302, area 304, etc.), vessel 10 can determine that the object is likely to impact safety of the user in the water (e.g., if a more precise location of a user was not, or cannot be, estimated).

Figure 4:
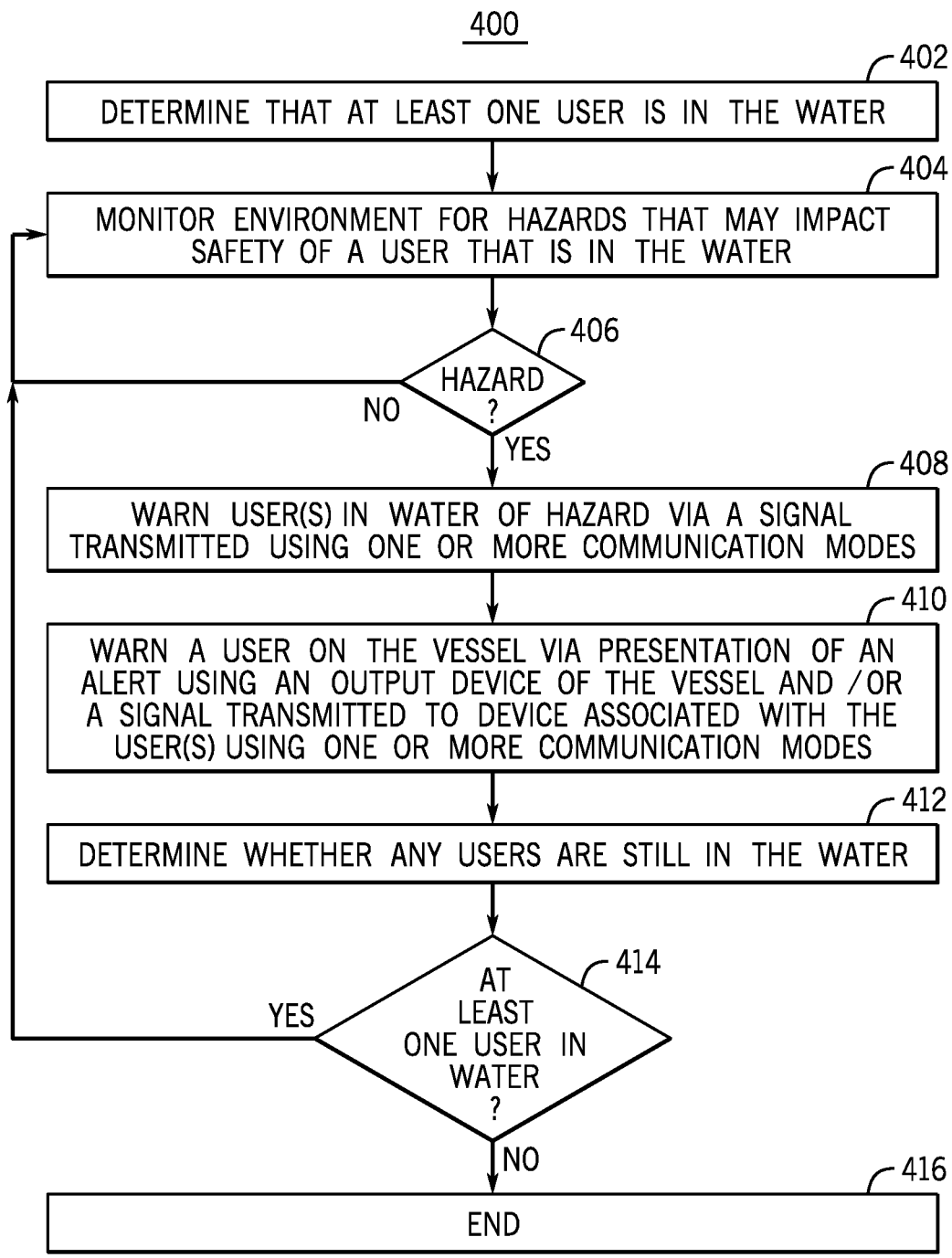
FIG. 4 shows an example of a process for detecting and warning users of hazards in a marine environment using a vision system of a marine vessel in accordance with some embodiments of the disclosed subject matter.

FIG. 4 shows an example of a process 400 for detecting and warning users of hazards in a marine environment using a vision system of a marine vessel in accordance with some embodiments of the disclosed subject matter.

At 402, process 400 can determine that at least one user (e.g., at least one passenger or crew member) is in the water. Note that a user can be considered in the water if the user is not using a floatation device or is using a personal floatation device (e.g., a life jacket), and a user can still be considered in the water if the user is using an unpowered floatation device (e.g., an inflatable, a foam floatation device, etc.) to stay at least partially out of the water. In some embodiments, process 400 can use any suitable technique or combination of techniques to determine that a user is in the water. For example, process 400 can determine that a user is in the water based on input indicating that one or more users are in the water around a vessel associate with process 400. In a more particular example, an operator can provide input (e.g., via input 228) that engages a mode, such as a swim mode, that indicates that a person is in the water around the vessel (e.g., such a person can be a swimmer, snorkeler, diver, etc.).

As another example, process 400 can determine that a user is in the water based on a speed of the vessel, and/or a state of a propulsion system of the vessel. In a more particular example, if a propulsion system of the vessel is not powered (and/or is in neutral) for at least a predetermined amount of time, and the vessel is moving at less than a threshold speed (e.g., if the vessel is anchored or moored in open water, or slowly drifting in open water), process 400 can determine that a user likely is in the water. In such an example, the vessel can prompt an operator to confirm whether a user has entered the water and/or a purpose for which the user has entered the water (e.g., swimming, tow sports, etc.).

As yet another example, process 400 can determine that a user is in the water based on image data of the environment (e.g., captured by, and/or received from one or more of sensors 72-78) includes a person entering the water from a direction of the vessel (e.g., while the propulsion system is not powered and/or is in neutral). Note that if image data includes a person entering the water while a propulsion system is providing thrust it can indicate that a person has fallen overboard, and the propulsion system can be inhibited to mitigate a risk of the person being harmed by the propulsion system.

As still another example, process 400 can determine that a user is in the water based on a state of a communication link with a wearable device, and/or a signal from a wearable device. In a more particular example, if the vessel (e.g., via a control system, such as control system 220) is monitoring a position of a wearable device (e.g., wearable device 240) associated with a user that is on board the vessel (e.g., using any suitable technique, such as Bluetooth techniques, BLE techniques, UWB techniques, etc.), and the vessel determines that the wearable device has moved at least a threshold distance from one or more devices used to estimate the location of the wearable device and/or distance to the wearable device (e.g., a transceiver(s)), process 400 can determine that the wearable device (and a user associated with the wearable device) is likely in the water around the vessel. Note that if the vessel is docked, and/or if a position of the wearable device coincides with particular type of object (e.g., land, a dock, another vessel, etc.) in the environment, process 400 can determine that the wearable device is unlikely to be in the water. As another more particular example, if the vessel (e.g., via a control system, such as control system 220) is monitoring a status of a communication link (e.g., a Bluetooth link, a BLE link, a UWB link, a cellular link, a Wi-Fi link, a ZigBee link, etc.) between the vessel (e.g., a transceiver of communication system 230) and the wearable device, and the vessel determines that the link has likely been dropped and/or otherwise disrupted (e.g., a heartbeat signal is not received, a response to an acknowledgment request is not received, etc.), process 400 can determine that the wearable device (and a user associated with the wearable device) is likely in the water around the vessel. In such an example, if the wearable device is submerged in the water, the water can significantly attenuate a signal from the vessel to the wearable device and/or from the wearable device to the vessel, thereby interrupting the communication link. As yet another further example, the vessel can receive a signal from the wearable device indicating that the wearable device (and a user associated with the wearable device) is in the water. In such an example, the wearable device can include a sensor configured to determine whether the wearable device is submerged in water, and can transmit a signal in response to an output of the sensor, which can be received by the vessel. Additionally or alternatively, in such an example, the wearable device can be configured to transmit a signal (e.g., a sound-based signal) that can be detected by a sensor and/or receiver of the vessel that is underwater. Detection of such a signal can indicate that the wearable device is in the water.

At 404, process 400 can monitor an environment for hazards that may impact safety of a user in the water. In some embodiments, process 400 can use any suitable technique or combination of techniques to monitor the environment for hazards (e.g., objects) that may impact safety of a user in the water. As described above in connection with FIG. 3, and below in connection with FIG. 6, in some embodiments, process 400 can estimate a position of a user in the water, and can monitor a position and velocity of one or more objects in the environment. In such embodiments, process 400 (and/or any other suitable process) can predict and/or project a path of one or more objects being monitored, and can determine whether the object is likely to impact a user (e.g., if an encounter between the object and the user is predicted, if a wake of the object is likely to impact the user's safety, etc.).

For example, process 400 can use image data from one or more imaging devices to identify objects in the environment that may impact safety of a user in the water (e.g., as described below in connection with FIG. 6). As another example, process 400 can use an occupancy grid to identify objects in the environment that may impact safety of a user in the water.

At 406, process 400 can determine whether one or more potential hazards monitored at 404 are likely to impact safety of a user in the water (e.g., whether any potential hazards are likely to impact safety of a user in the water during a predetermined time). If process 400 determines that there are no objects in the environment that are likely to impact safety of a user in the water ("NO" at 406), process 400 can return to 404, and can continue to monitor the environment for hazards that may impact safety of a user in the water.

Otherwise, if process 400 determines that one or more objects in the environment are likely to impact safety of a user in the water ("YES" at 406), process 400 can move to 408.

At 408, process 400 can warn one of more users in the water of the hazard via a signal transmitted using one or more communication modes using any suitable technique or combination of techniques, and/or devices. In some embodiments, process 400 can cause a signal (e.g., a warning signal) to be transmitted (e.g., using one or more communication modes) that is detectable by a wearable device(s) associated with a user(s). For example, process 400 can transmit a signal using a radio-wave based communication modality (e.g., Bluetooth, BLE, UWB, cellular, Wi-Fi, ZigBee, etc.). As another example, process 400 can transmit a signal using a sound-wave based communication modality (e.g., sonar). As yet another example, process 400 can transmit a signal using a light-wave based communication modality (e.g., using visible light, infrared light, ultraviolet light, etc.).

In some embodiments, a signal sent to warn one or more users can be encoded with information (e.g., a payload indicating that the wearable device is to present an alert indicative of a hazard to the user in the marine environment). Additionally or alternatively, such a signal may not be encoded with a payload (e.g., the signal can be a particular tone, combination of tones, or sequence of tones that indicate to the wearable device that the wearable device is to present an alert indicative of a hazard to the user in the marine environment). In some embodiments, a signal can be addressed to one or more particular wearable devices (e.g., wearable devices associated with users that are predicted to encounter a hazard). Additionally or alternatively, a signal can be transmitted without being addressed to any particular wearable device (e.g., the signal can be addressed to a group of devices, such as devices associated with the vessel, or the signal can be broadcast to all devices in range). In some embodiments, a signal can be transmitted to a particular wearable device and/or multiple wearable devices using an established communication link (e.g., using a particular frequency or frequencies, encoding scheme, timing, etc.) and/or a series of communication links (e.g., an established network). Additionally or alternatively, in some embodiments, a signal can be transmitted to one or more wearable devices without using an established communication link and/or network (e.g., the signal can be broadcast on one or more frequencies).

In some embodiments, process 400 can cause a signal to be transmitted (e.g., using one or more output devices) that is detectable by a user(s) using one or more senses, and that serves as an alert presented to the user that is indicative of a hazard to the user in the marine environment. For example, process 400 can use one or more speakers (e.g., a conventional speaker, an underwater speaker, etc.) to play a sound warning one or more users in the water of an approaching hazard. As another example, process 400 can use one or more sound producing devices (e.g., an air horn(s), a bell(s), a whistle(s), etc.) to sound a warning to one or more users in the water of an approaching hazard. As yet another example, process 400 can use one or more light sources to generate a visual warning to one or more users in the water of an approaching hazard (e.g., above water and/or under water). Note that although examples described herein are generally described in connection with wireless communications, a wearable device can be in communication with the vessel via a wired connection (e.g., a communication tether).

At 410, process 400 can warn one of more users on the vessel via presentation of an alert using an output device and/or display, and/or via a signal transmitted to a device associated with using one or more communication modes using any suitable technique or combination of techniques, and/or devices. In some embodiments, process 400 can cause a visual warning (e.g., a visual alert indicative of a hazard to the user in the marine environment) to be presented to a user(s) on the vessel (e.g., a user(s) that is responsible for keeping a lookout). For example, process 400 can use a display or display(s) (e.g., an MFD(s) such as display 29, a HUD such as HUD 35, etc.) of the vessel to present a visual warning (e.g., via a graphical user interface presented by the display). As another example, process 400 can use an indicator light(s) of the vessel to present a visual warning (e.g., an indicator light in operation console 22). As yet another example, process 400 can cause a visual warning to be presented by a mobile device associated with a user(s) on the vessel (e.g., a wearable device such as wearable device 240, a smartphone, a tablet computer, another type of wearable device such as a smartwatch or HMD, etc.), such as a mobile device that has been paired with the vessel.

Additionally or alternatively, in some embodiments, process 400 can cause an audio warning (e.g., an audio alert indicative of a hazard to the user in the marine environment) to be presented to a user(s) on the vessel (e.g., a user(s) that is responsible for keeping a lookout). For example, process 400 can use a speaker and/or sound producing device of the vessel to present an audio warning. As another example, process 400 can cause an audio warning to be presented by a mobile device associated with a user(s) on the vessel (e.g., a wearable device, a smartphone, a tablet computer, etc.) such as a mobile device that has been paired with the vessel. As yet another example, process 400 can cause a tactile warning (e.g., via haptic feedback) to be presented by a mobile device associated with a user(s) on the vessel (e.g., a wearable device, a smartphone, a tablet computer, etc.) such as a mobile device that has been paired with the vessel.

In some embodiments, process 400 can warn an operator (and/or other person(s)) on another vessel(s) (e.g., a vessel that may impact safety of a user in the water) of the presence of a user in the water. For example, process 400 can transmit a message (e.g., a V2V message, a V2E message, etc.) that causes an alert to be presented to an operator (and/or other person(s)) indicating that there are people in the water (e.g., near the vessel that sent the message) using any suitable output device and/or display.

At 412, process 400 can determine whether at least one user is still in the water. In some embodiments, process 400 can use any suitable technique or combination of techniques to determine whether at least one user is still in the water. For example, process 400 can determine that no users remain in the water based on input indicating that there are no users in the water. In a more particular example, an operator can provide input (e.g., via input 228) that disengages a mode, such as a swim mode. As another example, process 400 can determine that no users remain in the water based on a speed of the vessel, and/or a state of a propulsion system of the vessel. In a more particular example, if a propulsion system of the vessel is powered (and/or is in gear) for, and the vessel begins moving at least a threshold speed, process 400 can determine that no users are in the water (note that, in some embodiments, an imaging device can monitor an area around a propulsor to determine whether any people are near the propulsor, and can inhibit the propulsor if a person is in the water within a predetermined near the propulsor). In such an example, the vessel can prompt an operator to confirm whether all users are out of the water and/or a purpose for which any user remains in the water (e.g., tow sports, etc.) prior to determining that no users remain in the water. As yet another example, process 400 can determine that no users remain in the water based on image data of the environment (e.g., captured by, and/or received from one or more of sensors 72-78) not including any people. As still another example, process 400 can determine that no users remain in the water based on a state of a communication link with a wearable device, and/or a signal from a wearable device (e.g., if a location of all wearable devices are on board the vessel, if the vessel receives a signal from all wearable devices indicating that the wearable device has been out of the water for a predetermined time, etc.). As a further example, process 400 can determine that no users remain in the water based on a signal received from each wearable device that was previously in the water (e.g., transmitted in response to input to the wearable device indicating that the user has boarded the vessel).

If process 400 determines that there is not at least one user in the water ("NO" at 414), process 400 can move to 416, and can end (and/or can return to a process for determining whether at least one user is in the water).

Otherwise, if process 400 determines that there is at least one user in the water ("YES" at 414), process 400 can return to 404.

Figure 5:
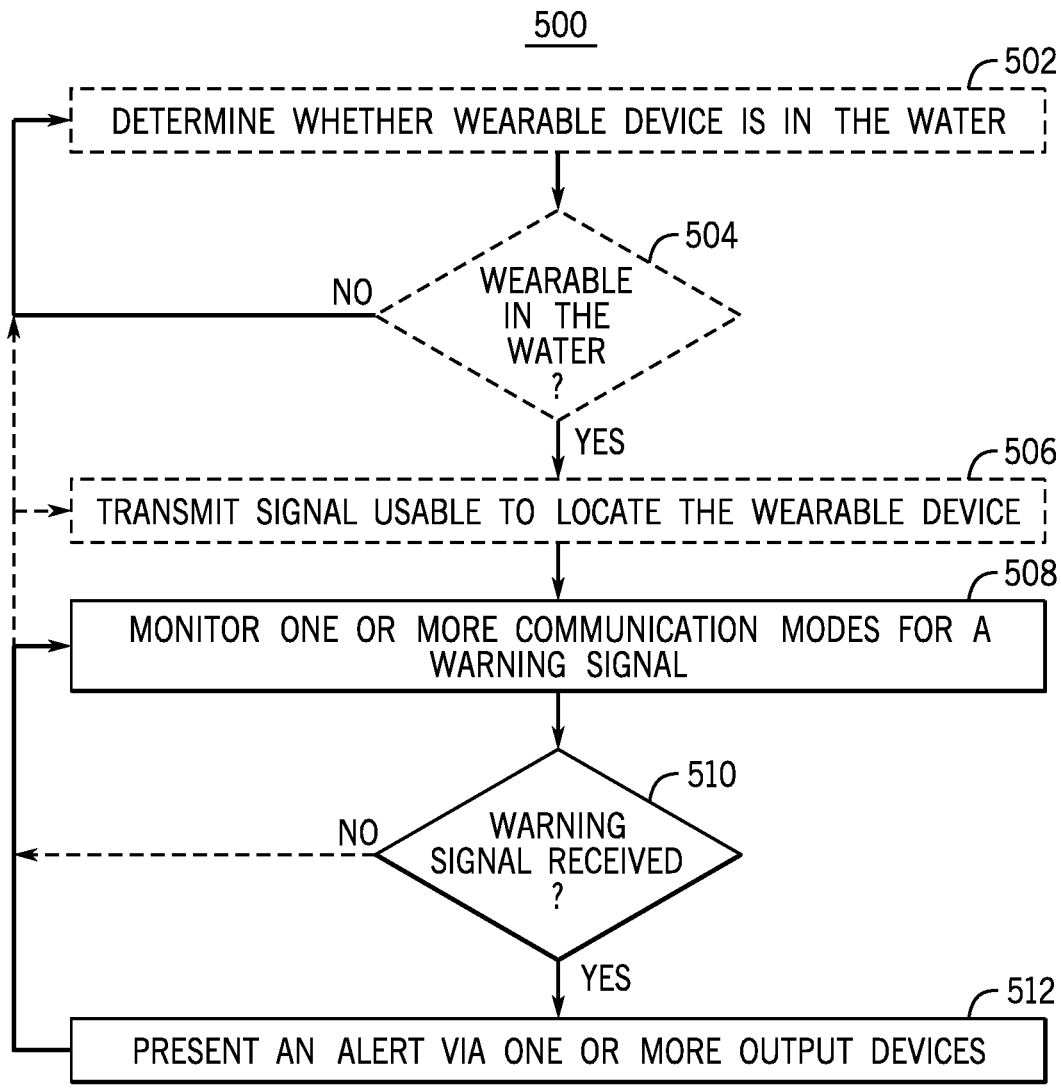
FIG. 5 shows an example of a process for warning a user of a hazard detected by a marine vessel in a marine environment using a wearable device in accordance with some embodiments of the disclosed subject matter.

FIG. 5 shows an example of a process 500 for warning a user of a hazard detected by a marine vessel in a marine environment using a wearable device in accordance with some embodiments of the disclosed subject matter.

At 502, process 500 can determine whether the wearable deice is in the water using any suitable technique or combination of techniques. For example, the wearable device can include a sensor configured to determine whether the wearable device is submerged in water. As another example, the wearable device can detect an interruption in of a communication link between the wearable device and the vessel, as water can significantly attenuate a signal from the vessel to the wearable device and/or from the wearable device to the vessel, thereby interrupting or otherwise disrupting the communication link. As yet another example, the wearable device can determine a distance to a particular portion(s) of the vessel (e.g., using any suitable technique, such as Bluetooth techniques, BLE techniques, UWB techniques, etc.), and process 500 can determine that the wearable device is likely in the water if the distance exceeds a threshold.

If process 500 determines that the wearable device is not in the water ("NO" at 504), process 500 can return to 502, and continue to monitor whether the wearable device is in the water.

Otherwise, if process 500 determines that the wearable device is in the water ("YES" at 504), process 500 can move to 506 and/or 508. In some embodiments, process 500 can omit 502 and/or 504, for example if the wearable device is configured to monitor for warning signals relatively continuously (e.g., at 508), or if the wearable device can be activated when entering the water (e.g., in response to detection of water), and deactivated when exiting the water (e.g., when boarding the vessel).

At 506, process 500 can transmit a signal that is useable (e.g., by a device on vessel 10) to determine a location of the wearable device. In some embodiments, any suitable technique or combination of techniques can be used to determine a location of the wearable device, which can include transmitting any suitable signal. For example, process 500 can cause a signal to be transmitted that can be used to determine a distance to the wearable device and/or a direction to the wearable device, such as a UWB signal, a BLE signal, a Bluetooth signal, a sonic signal (e.g., an ultrasound ping), etc. As another example, process 500 can cause a signal to be transmitted that is encoded with a location of the wearable device (e.g., determined using a GPS receiver of the wearable device, or another location technology such as UWB, BLE, etc.). In some embodiments, a signal transmitted for location determination can be different than (or in addition to) a signal transmitted for communication with the vessel. For example, a first wireless communication modality can be used to transmit information (e.g., a Bluetooth link, a cellular link, a Wi-Fi link, a ZigBee link, etc.), and a different wireless communication modality can be used for determining a location of the wearable device (e.g., BLE, UWB, ultrasound, etc.). In some embodiments, process 500 can omit 506, for example if the wearable device is not configured to transmit a suitable signal(s), if a location of the user is determined using a vision system of the vessel, etc.

At 508, process 500 can monitor one or more communication modes for a warning signal. For example, process 500 can monitor a radio-wave based communication modality for a warning signal(s) (e.g., using a wireless transceiver(s)). As another example, process 500 can monitor a sound-wave based communication modality for a warning signal(s) (e.g., using a transducer, a hydrophone, etc.). As yet another example, process 500 can monitor a light-wave based communication modality for a warning signal(s) (e.g., using a light detector).

If process 500 determines that a warning signal has not been received ("NO" at 510), process 500 can return to 502, 506, and/or 508, and continue to monitor for warning signals.

Otherwise, if process 500 determines a warning signal has been received ("YES" at 510), process 500 can move to 512.

At 512, process 500 can present an alert via one or more output devices and/or displays of the wearable device. For example, process 500 can use a device described above in connection with display/output device(s) 246 of FIG. 2, such as a display, an indicator light, a haptic feedback device, a speaker, a bone conduction device, etc.

In some embodiments, the alert can include particular information (e.g., information encoded in a warning signal, information transmitted in connection with the warning signal, information identified by the form and/or content of the warning signal, etc.) that can be presented to a user (such as a message to return to the vessel, a message indicating that a hazard is approaching, a message indicating the nature of a hazard that is approaching, etc.). Alternatively, in some embodiments, the alert can be a generic warning to return to the vessel and/or to contact a user on board the vessel.

Figure 6:
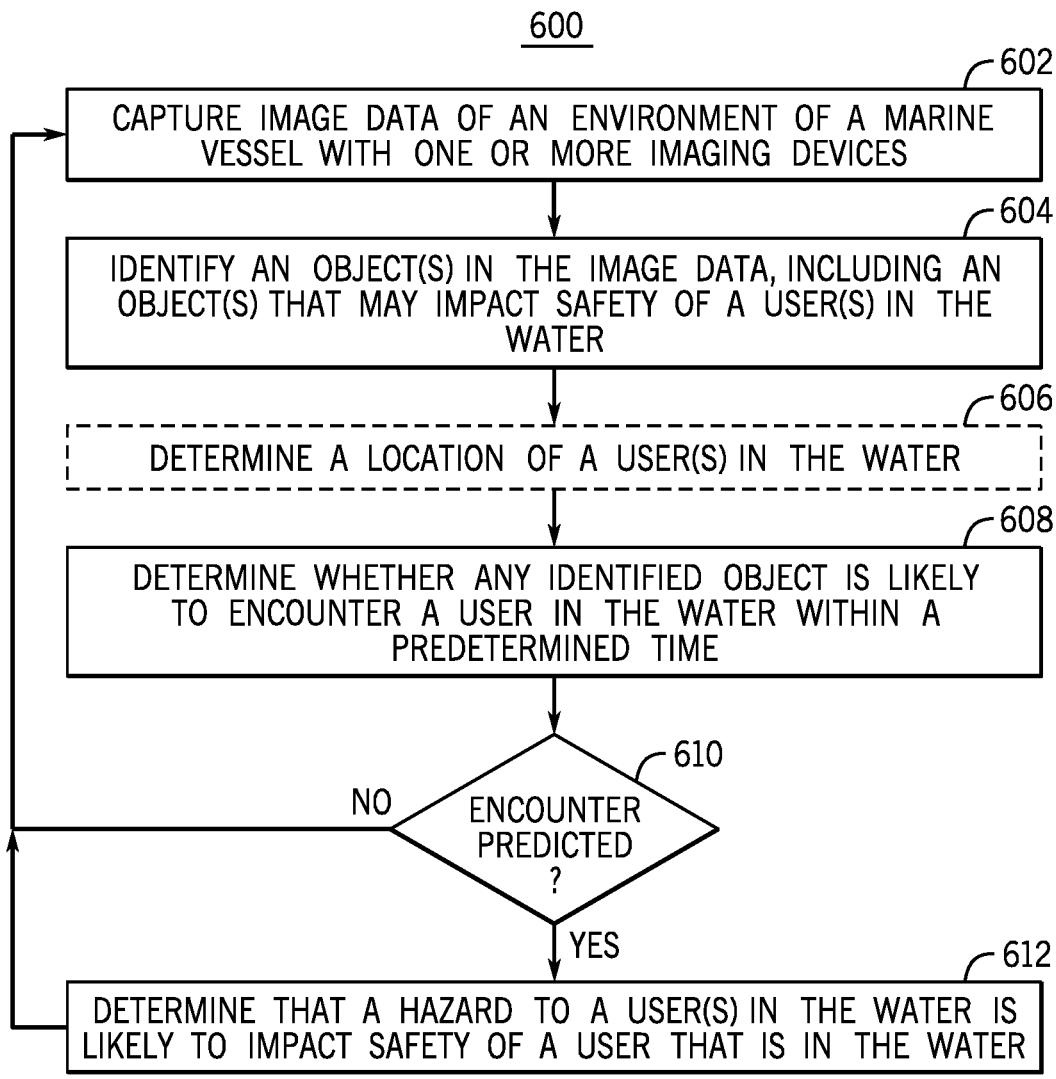
FIG. 6 shows an example of a process for detecting a hazard in a marine environment that may impact safety of a user in accordance with some embodiments of the disclosed subject matter.

FIG. 6 shows an example of a process 600 for detecting a hazard in a marine environment that may impact safety of a user in accordance with some embodiments of the disclosed subject matter.

At 602, process 600 can capture (and/or receive) image data of an environment of a marine vessel with one or more imaging devices. In some embodiments, process 600 can capture image data of an environment of the marine vessel using any suitable imaging device, such as one or more of sensors 72-78, and/or any other suitable imaging device described above. Note that the image data can be in any suitable format and/or multiple formats. For example, the image data can be a conventional two-dimensional digital image(s) (e.g., RGB data, grayscale data, monochrome data, etc., encoded in a RAW format, a high efficiency image file format (HEIF), a joint picture group (JPEG) format, etc.). As another example, the image data can be a conventional three-dimensional image (e.g., including a depth map, an RGBD image, etc.). As yet another example, the image data can be a point cloud or portion of a point cloud or other 3D format (e.g., generated by a lidar, radar, or sonar device).

At 604, process 600 can identify one or more objects represented in the image data, including one or more objects that may impact safety of a user in the water. In some embodiments, process 600 can use any suitable technique or combination of techniques to identify an object(s) in the image data, and in particular an object(s) that may impact safety of a user in the water in image data captured and/or received at 602.

In some embodiments, process 600 can use image data from the one or more imaging devices to detect objects in the environment, such as objects that may impact safety of a user in the water. For example, in some embodiments, process 600 can use a trained machine learning model that has been trained to identify objects in an environment that may impact safety of a user in the water. In a more particular example, the trained machine learning model can be trained to identify objects, such as different types of marine vessels, waves, wakes, other relatively fast moving objects, large and/or dangerous wildlife, etc., that may impact safety of a user in the water near a marine vessel executing process 600. In such an example, process 600 can use a trained machine learning model that is trained to predict to which class of a set of classes objects in the image are most likely to correspond (e.g., a model trained to perform image segmentation, a model trained to perform object recognition, etc.), in which a subset of classes are objects that may impact safety of a user in the water.

In some embodiments, process 600 can generate and/or utilize segmentation information (e.g., based on image data captured and/or received at 602) to identify an object(s) that may impact safety of a user in the water. In some embodiments, the segmentation information can include classification information that indicates which of a set of classes different portions of the image are most likely to correspond. In some embodiments, the set of classes can include classes that are relatively likely for the vessel to encounter (e.g., in a marine environment). For example, the set of classes can include one or more classes of bodies of water, such as one or more broad class of water feature, and/or multiple more specific classes of water features. As another example, the set of classes can include one or more classes of structure, such as one or more broad class of structural feature (e.g., structure), and/or multiple more specific classes of structural features (e.g., dock, bridge, building, sea wall or more specific classes such as concrete sea wall or rock sea wall, etc.). As yet another example, the set of classes can include one or more classes of vessel, such as one or more broad class of vessel feature (e.g., vessel, boat, motor vehicle, etc.), and/or multiple more specific classes of vessel features (e.g., boat, large boat, small boat, personal watercraft or more specific classes such as jet ski, sail boat, human-powered watercraft or more specific classes such as: canoe; kayak; or standup paddle board, etc.). In such an example, the segmentation information can include a class corresponding to features of the vessel associated with the imaging device(s) that captures the image data (e.g., an ego vessel class). As still another example, the set of classes can include one or more classes of animals, such as one or more broad class of animal features (e.g., person, marine animal, terrestrial animal, etc.), and/or multiple more specific classes of animal features (e.g., shark and/or particular types of sharks, fish and/or particular types of fish, marine mammal and/or particular types of marine mammals, reptile and/or particular types of reptile, etc.). As a further example, the set of classes can include one or more classes of open space and/or land, such as one or more broad class of sky feature and/or land feature, and/or multiple more specific classes of sky features and/or specific classes of land.

In some embodiments, process 600 can generate the segmentation information using any suitable technique or combination of techniques, and the segmentation information can be in any suitable format. For example, process 600 can provide one or more images to a trained machine learning model that was trained to generate segmentation information classifying regions (e.g., each corresponding to one or more pixels of the image) as most likely belonging to a certain class and/or a probability of the region corresponding to each of various classes. In such an example, process 600 can receive the segmentation information from the trained machine learning model.

In some embodiments, the segmentation information can be formatted using any suitable format. For example, the segmentation information can be formatted as a set of masks, each corresponding to a particular class, where a particular value (e.g., a binary 1) indicates that the class is likely present at a region (e.g., a pixel or group of pixels), and another value (e.g., a binary 0) indicates that the class is likely not present at a region. In such an example, the segmentation information can be formatted as a matrix having rows and columns equal to the rows and columns of the image data provided to the trained machine learning model. As another example, the segmentation information can be formatted as a set of masks, each corresponding to a particular class, where a value (e.g., in a range of 0 and 1) indicates a likelihood that the class is present at a region (e.g., a pixel or group of pixels). As yet another example, the segmentation information can be formatted as an image in which a color at each pixel indicates a classification of the pixel (e.g., "sky" can be encoded with RGB brightness values (r,g,b) using an eight bit scale, for example as rgb=(0,0,255)). In such an example, the pixel may or may not be associated with a confidence value (e.g., class can be encoded using one or more of the red, green, and blue channels, and confidence can be encoded in a channel not used to encode class, which may or may not be a color channel). Note that the image captured by the imaging device (and/or received) at 602 may have a different number of rows and/or columns than the image provided to the trained machine learning model. The image data received from the imaging device may have more pixels or other data points (e.g., it may be a higher resolution) than the image data provided to the trained machine learning model, as the trained machine learning model may require image data with a particular number of pixels or other data points as input, and/or a particular number of color channels (e.g., a grayscale image with a single channel, a color image with multiple color channels, etc.). In some embodiments, the machine learning model can be trained to utilize depth information (e.g., in a depth channel of the image provided to the machine learning model). Additionally or alternatively, in some embodiments, depth information can be used to supplement the segmentation information (e.g., to check, confirm, and/or refine the segmentation to confirm that the object has dimensions consistent with the class indicated in the segmentation information).

In some embodiments, the image data provided to the machine learning model at 604 can be an image captured by an imaging device at 602 that is also used to generate depth information. As another example, the image data provided to the machine learning model at 604 can be image data captured by an imaging device at 602 that is not used to generate depth information. In such an example, the image data can be image data from an image sensor that is co-located with a depth sensor used to generate depth information and having a field of view that encompasses at least a portion of the field of view of the depth sensor. In a particular example, sensor device 202 can include two monochromatic image sensors that are used for stereoscopic depth sensing, and a color (e.g., RGB) image sensor that can be used for segmentation, display, etc.

In some embodiments, one or more additional trained machine learning models (and/or other computer vision techniques) can be used to provide supplemental information that can be used to label the segmentation information, or can be used in lieu of the segmentation information. For example, process 600 can use one or more trained machine learning models that generate object detection information (e.g., as bounding boxes for a portion of an image including a particular class of object) in lieu of, or in addition to, the segmentation information, and a result of the object detection information can be used to provide supplemental information that can be used to label the segmentation information, or can be used in lieu of the segmentation information.

In some embodiments, process 600 can identify objects classified as one or more particular classes as objects that may impact safety of a user in the water, and can disregard objects classified in one or more other particular classes. For example, process 600 can identify features classified as particular classes (e.g., marine vessels, wildlife, etc.) that are likely to impact safe navigation of the marine vessel, and can disregard objects classified in one or more other particular classes.

In some embodiments, information about objects in the environment that have been identified as objects that may impact safety of a user in the water can be included in an occupancy grid. For example, a processor(s) executing at least a portion of process 600 (and/or any other suitable process, such as processes described herein) can generate and/or update an occupancy grid based on objects identified at 604. In some embodiments, the occupancy grid can be formatted as a data structure in which each element corresponds to a cell of the occupancy grid, and each element is indicative of a probability that the cell is occupied by an object/obstacle. In some embodiments, each cell can represent a volume of the environment (e.g., having a width, depth, and height). For example, each cell can represent a volume that is 0.25 meters (m) by 0.25 m laterally, and extends from a water surface to a height at or above the top of the vessel. In some embodiments, location information corresponding to objects in the environment can be used to generate a model (e.g., using a point cloud) of objects in an environment around the vessel based on the location of the objects. The model of the objects in the environment can be used to identify cells in the occupancy grid that are more likely to contain an obstruction, and those that are less likely. In some embodiments, the occupancy grid can be updated in real-time based on recent measurements of a portion of the environment within a predetermined range of the vision system of the vessel (e.g., including one or more depth sensors(s), such as sensors 72-78).

In some embodiments, the occupancy grid can include multiple layers (e.g., each cell can be associated with multiple elements) that indicate a probability that the cell is occupied by a particular type of object (and/or in an area associated with a particular object, such as a safety area associated with a user in the water, a hazardous area associated with a hazardous object in the water, etc.), and/or that an object in the cell may impact safety of a user in the water. For example, each cell can be associated with an element indicative of a probability of any object being present in the cell. As another example, each cell can be associated with an element indicative of a probability of an object that may impact safety of a user in the water.

In some embodiments, process 600 can determine whether any objects that may impact safety of a user in the water impact are within a predetermined area around the marine vessel (e.g., area 302, area 304), and/or within a predetermined area around one or more users in the water (e.g., safety area 308 or 310). For example, process 600 can determine whether any objects are within an area around the marine vessel defined by a radius (e.g., tens of meters to hundreds of meters) from a particular point (e.g., a point of navigation, a COR, a COG, etc.). In such an example, process 600 can analyze objects that fall at least partially within the circular area to determine whether the object is an object that may impact safety of a user in the water.

At 606, process 600 can determine a location of a user or users in the water around the vessel using any suitable technique or combination of techniques, such as techniques described above in connection with FIG. 3. In some embodiments, process 600 can attempt to determine whether a user is near the surface of the water (e.g., within 1-2 m of the surface), or is deeper (e.g., more than 1-2 m below the surface of the water). For example, a wearable device associated with the user can be configured to measure depth (e.g., based on water pressure) and provide a value indicative of depth to the vessel (e.g., via any suitable communication mode). As another example, the vessel can use an underwater imaging technique (e.g., sonar, or side-scan sonar) to attempt to estimate a depth of a user (e.g., a user that is diving).

At 608, process 600 can determine whether any identified objects that may impact safety of one or more users in the water is likely to encounter a user in the water within a predetermined time. In some embodiments, process 600 can use any suitable technique or combination of techniques to determine whether any identified objects that may impact safety of one or more users in the water is likely to encounter a user in the water within a predetermined time, such as techniques described above in connection with FIG. 3. Note that an object that is predicted and/or projected to pass relatively far from a user can still impact safety of the user in the water (e.g., a wake generated by the object can travel over relatively long distances and endanger a user in the water). In some embodiments, process 600 can determine that an encounter is unlikely if the user is at a sufficient depth below a surface of the water (e.g., based on a draft of a vessel identified as an object that may impact safety of one or more users in the water, based on a depth of an animal that may impact safety of one or more users in the water, etc.).

In some embodiments, the predetermined time can vary based on a location of the user with respect to the vessel. For example, if the user is located farther from the vessel, it may take longer for the user to return to the vessel and the user may need more advance warning to avoid a hazardous object. In such an example, process 600 can analyze a relatively longer period of time. As another example, if the user is located relatively close to the vessel, the user may be able to return to the vessel quickly and may need less advance warning to avoid a hazardous object. In such an example, process 600 can analyze a relatively shorter period of time.

If process 600 determines that an encounter between a hazard and a user in the water is predicted within the predetermined period of time ("YES" at 610), process 600 can move to 612.

At 612, process 600 can determine that a hazard to a user in the water is likely to impact the safety of a user that is in the water. In some embodiments, a determination at 612 that a hazard to a user in the water is likely to impact the safety of a user that is in the water, can lead to a warning and/or alert being presented to a user(s) (e.g., at 408 and/or 410 of FIG. 4, at 512 of FIG. 5, etc.).

Otherwise, if process 600 determines that an encounter between a hazard and a user in the water is not predicted within the predetermined period of time ("NO" at 610), process 600 can return to 602.

Further Examples Having a Variety of Features

Implementation examples are described in the following numbered clauses:

1. A method for detecting and warning users of hazards in a marine environment using a vision system of a marine vessel, the method comprising: identifying, based on image data from an imaging device, an object in the environment that is a potential hazard for a swimmer, wherein the object is associated with a location in the environment of the marine vessel, and wherein the imaging device is configured to be mounted to the marine vessel with an associated field of view of the marine environment of the marine vessel, the marine environment including water; determining whether the object is likely to impact safety of a user of the marine vessel that is in the water; in response to determining that the object is likely to impact safety of the user in the water, causing an alert to be presented based on the determination that the object is likely to impact safety of the user, the alert indicative of a hazard to the user in the marine environment.

2. The method of clause 1, further comprising determining that at least one user is in the water; identifying, during a time period when the user is in the water, whether objects in the environment that is a potential hazard for a swimmer.

3. The method of any one of clauses 1 or 2, wherein the imaging device comprises a stereoscopic camera.

4. The method of any one of clauses 1 to 3, further comprising: presenting the alert using an output device.

5. The method of clause 4, wherein the output device comprises a multi-function display.

6. The method of any one of clauses 1 to 5, further comprising establishing a communication link with a mobile device; in response to determining that the object is likely to impact safety of the user in the water, transmitting a signal to the mobile device indicative of hazard to the user in the maritime environment, thereby causing the mobile device to present the alert.

7. The method of clause 6, wherein the mobile device is configured to be worn by the user.

8. The method of any one of clauses 6 or 7, further comprising transmitting the signal using a first communication modality; and in response to determining that the object is likely to impact safety of the user in the water, transmitting a second signal to the mobile device indicative of hazard to the user in the maritime environment using a second communication modality.

9. The method of clause 8, further comprising: transmitting the signal using a wireless transceiver configured to transmit signals using electromagnetic waves; and transmitting the second signal using a transducer configured to transmit signals using sound waves, wherein the first communication modality utilizes electromagnetic waves, and the second communication modality utilizes sound waves.

10. The method of any one of clauses 1 to 9, further comprising determining, based on the image data from the imaging device, a classification of the object from a plurality of classes; and identifying the object as a potential hazard based on the classification.

11. The method of any one of clauses 1 to 10, further comprising estimating a location of the user with respect to the marine vessel; predicting a location of the object at each of a plurality of times within a predetermined period of time; determining whether the object is predicted to be within a predetermined distance of the user at any of the plurality of times; in response to determining that the object is predicted to be within the predetermined distance at any of the plurality of times, determining that the object is predicted to encounter the user within the predetermined period of time; and in response to determining that the object is predicted to encounter the user within the predetermined period of time, determining that the object is likely to impact safety of the user in the water.

12. The method of clause 11, further comprising: receiving image data from each of a plurality of imaging devices including the imaging device, wherein each of the plurality of imaging devices is configured to be mounted to the marine vessel with an associated field of view of the marine environment of the marine vessel, and wherein each of the plurality of imaging devices is associated with a three-dimensional camera coordinate system; identifying, based on image data from a first imaging device of the plurality of imaging devices, a person in the water; determining three-dimensional location information associated with the person in a three-dimensional global coordinate system based on a transform between the camera coordinate system associated with the first imaging device and the global coordinate system; and estimating the location of the user based on the three-dimensional location information associated with the person.

13. The method of any one of clauses 11 or 12, wherein the predetermined distance is based on a speed of the object, such that at a first speed $v_1$ the predetermined distance is a first value $d_1$ and at a second speed $v_2$ the predetermined distance is a second value $d_2$, $v_2 > v_1$ and $d_2 > d_1$.

14. The method of any one of clauses 1 to 13, further comprising receiving the image data from the imaging device; determining, based on the image data, that the object is a second marine vessel; and in response to determining that the object is likely to impact safety of the user in the water, transmitting a second alert to the second marine vessel, the second alert indicative of a swimmer present in the marine environment.

15. The method of any one of clauses 1 to 14, further comprising: establishing, from a wearable device, a communication link with the marine vessel; determining that the wearable device is in water; in response to determining that the wearable device is in water, monitoring, using one or more receivers of the wearable device, one or more communication modes for a warning signal from the marine vessel; receiving, at the wearable device from the marine vessel, a warning signal via at least one communication mode of the one or more communication modes; and in response to receiving the warning signal, causing a haptic feedback device of the wearable device to provide haptic feedback indicative of a hazard to a user in the marine environment, thereby presenting the alert.

16. A method for warning users of hazards in a marine environment using a wearable device, the method comprising: establishing a communication link with a marine vessel; determining that the wearable device is in water; in response to determining that the wearable device is in water, monitoring, using one or more receivers of the wearable device, one or more communication modes for a warning signal from the marine vessel; receiving, from the marine vessel, a warning signal via at least one communication mode of the one or more communication modes; and in response to receiving the warning signal, causing a haptic feedback device of the wearable device to provide haptic feedback indicative of a hazard to a user in the marine environment.

17. The method of any one of clauses 15 or 16, further comprising: monitoring a first communication mode using a first receiver of the one or more receivers, wherein the first receiver comprises a wireless transceiver configured to receive signals transmitted using electromagnetic waves; and monitoring a second communication mode using a second receiver of the one or more receivers, wherein the second receiver comprises a transducer configured to detect signals transmitted using sound waves.

18. A system comprising: one or more processors configured to: perform a method of any of clauses 1 to 17.

19. A non-transitory computer-readable medium storing computer-executable code, comprising code for causing a computer to cause a processor to: perform a method of any of clauses 1 to 17.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 4-6 can be executed or performed in any suitable order or sequence not limited to the order and sequence shown and described in the figures. Also, some of the above steps of the processes of FIGS. 4-6 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for detecting and warning users of hazards in a marine environment using a vision system of a marine vessel, the system comprising:
   an imaging device,
      wherein the imaging device is configured to be mounted to the marine vessel with an associated field of view of the marine environment of the marine vessel, and
      wherein the marine environment includes water; and
   one or more hardware processors configured to:
      identify, based on image data from the imaging device, an object in the environment that is a potential hazard for a swimmer,
         wherein the object is associated with a location in the environment of the marine vessel;
      determine whether the object is likely to impact safety of a user of the marine vessel that is in the water; and
      in response to determining that the object is likely to impact safety of the user in the water, cause an alert to be presented based on the determination that the object is likely to impact safety of the user,
         the alert indicative of a hazard to the user in the marine environment.

2. The system of claim 1, wherein the one or more hardware processors are further configured to:
   determine that at least one user is in the water; and
   identify, during a time period when the user is in the water, whether objects in the environment that are a potential hazard for a swimmer.

3. The system of claim 1, wherein the imaging device comprises a stereoscopic camera.

4. The system of claim 1, further comprising:
an output device;
wherein the one or more hardware processors are further configured to:
   present the alert using the output device.

5. The system of claim 4, wherein the output device comprises a multi-function display.

6. The system of claim 1, wherein the one or more hardware processors are further configured to:
   establish a communication link with a mobile device; and
   in response to determining that the object is likely to impact safety of the user in the water, transmit a signal to the mobile device indicative of hazard to the user in the marine environment, thereby causing the mobile device to present the alert.

7. The system of claim 6, wherein the mobile device is configured to be worn by the user.

8. The system of claim 6, wherein the one or more hardware processors are further configured to:
   transmit the signal using a first communication modality; and
   in response to determining that the object is likely to impact safety of the user in the water, transmit a second signal to the mobile device indicative of hazard to the user in the marine environment using a second communication modality.

9. The system of claim 8, further comprising:
a wireless transceiver configured to transmit signals using electromagnetic waves; and
a transducer configured to transmit signals using sound waves,
   wherein the first communication modality utilizes electromagnetic waves, and the second communication modality utilizes sound waves.

10. The system of claim 1, wherein the one or more hardware processors are further configured to:
   determine, based on the image data from the imaging device, a classification of the object from a plurality of classes; and
   identify the object as a potential hazard based on the classification.

11. The system of claim 1, wherein the one or more hardware processors are further configured to:
   estimate a location of the user with respect to the marine vessel;
   predict a location of the object at each of a plurality of times within a predetermined period of time;
   determine whether the object is predicted to be within a predetermined distance of the user at any of the plurality of times;
   in response to determining that the object is predicted to be within the predetermined distance at any of the plurality of times, determine that the object is predicted to encounter the user within the predetermined period of time; and
   in response to determining that the object is predicted to encounter the user within the predetermined period of time, determine that the object is likely to impact safety of the user in the water.

12. The system of claim 11, further comprising:
a plurality of imaging devices, including the imaging device,
   wherein each of the plurality of imaging devices configured to be mounted to the marine vessel with an associated field of view of the marine environment of the marine vessel, and
   wherein each of the plurality of imaging devices is associated with a three-dimensional camera coordinate system;
wherein the one or more hardware processors are further configured to:

receive image data from each of the plurality of imaging devices;

identify, based on image data from a first imaging device of the plurality of imaging devices, a person in the water;

determine three-dimensional location information associated with the person in a three-dimensional global coordinate system based on a transform between the camera coordinate system associated with the first imaging device and the global coordinate system; and estimate the location of the user based on the three-dimensional location information associated with the person.

13. The system of claim 11, wherein the predetermined distance is based on a speed of the object, such that at a first speed $v_1$ the predetermined distance is a first value $d_1$ and at a second speed $v_2$ the predetermined distance is a second value $d_2$, $v_2>v_1$ and $d_2>d_1$.

14. The system of claim 1, wherein the one or more hardware processors are further configured to:

receive the image data from the imaging device;

determine, based on the image data, that the object is a second marine vessel; and in response to determining that the object is likely to impact safety of the user in the water, transmit a second alert to the second marine vessel, the second alert indicative of a swimmer present in the marine environment.

15. The system of claim 1, further comprising:

a wearable device for warning users of hazards in the marine environment, comprising:

a haptic feedback device;

one or more receivers; and at least one hardware processor configured to:

establish a communication link with the marine vessel;

determine that the wearable device is in water;

in response to determining that the wearable device is in water, monitor, using the one or more receivers, one or more communication modes for a warning signal from the marine vessel;

receive, from the marine vessel, a warning signal via at least one communication mode of the one or more communication modes; and in response to receiving the warning signal, cause the haptic feedback device to provide haptic feedback indicative of a hazard to a user in the marine environment, thereby presenting the alert.

16. A method for detecting and warning users of hazards in a marine environment using a vision system of a marine vessel, the method comprising:

identifying, based on image data from an imaging device, an object in the environment that are a potential hazard for a swimmer, wherein the object is associated with a location in the environment of the marine vessel, and wherein the imaging device is configured to be mounted to the marine vessel with an associated field of view of the marine environment of the marine vessel, the marine environment including water;

determining whether the object is likely to impact safety of a user of the marine vessel that is in the water; and in response to determining that the object is likely to impact safety of the user in the water, causing an alert to be presented based on the determination that the object is likely to impact safety of the user, the alert indicative of a hazard to the user in the marine environment.

17. The method of claim 16, further comprising determining that at least one user is in the water;

identifying, during a time period when the user is in the water, whether objects in the environment that are a potential hazard for a swimmer.

18. The method of claim 16, wherein the imaging device comprises a stereoscopic camera.

19. A wearable device for warning users of hazards in a marine environment, the wearable device comprising:

a haptic feedback device;

one or more receivers; and one or more hardware processors configured to:

establish a communication link with a marine vessel;

determine that the wearable device is in water;

in response to determining that the wearable device is in water, monitor, using the one or more receivers, one or more communication modes for a warning signal from the marine vessel;

receive, from the marine vessel, a warning signal via at least one communication mode of the one or more communication modes; and in response to receiving the warning signal, cause the haptic feedback device to provide haptic feedback indicative of a hazard to a user in the marine environment.

20. The wearable device of claim 19, the one or more receivers comprising:

a wireless transceiver configured to receive signals transmitted using electromagnetic waves; and a transducer configured to detect signals transmitted using sound waves.

* * * * *